(12) United States Patent
Koepke

(10) Patent No.: US 9,781,248 B2
(45) Date of Patent: Oct. 3, 2017

(54) TELECOMMUNICATIONS EMERGENCY DEVICE

(71) Applicant: Ted J. Koepke, Foothill Ranch, CA (US)

(72) Inventor: Ted J. Koepke, Foothill Ranch, CA (US)

(*) Notice: Subject to any disclaimer, the term of this patent is extended or adjusted under 35 U.S.C. 154(b) by 0 days.

(21) Appl. No.: 15/441,111

(22) Filed: Feb. 23, 2017

(65) Prior Publication Data

US 2017/0251096 A1  Aug. 31, 2017

Related U.S. Application Data

(60) Provisional application No. 62/300,363, filed on Feb. 26, 2016.

(51) Int. Cl.
| | | |
|---|---|---|
| *H04M 11/04* | (2006.01) | |
| *H04M 1/725* | (2006.01) | |
| *H04W 64/00* | (2009.01) | |
| *H04W 4/02* | (2009.01) | |

(52) U.S. Cl.
CPC ......... *H04M 1/72538* (2013.01); *H04W 4/02* (2013.01); *H04W 64/006* (2013.01)

(58) Field of Classification Search
CPC ... H04W 4/02; H04W 64/006; H04W 76/007; H04W 4/22; H04M 1/72538; H04M 11/04; B64D 1/12; B64D 9/00; B64D 2045/0065; B64C 39/024; B64C 2201/027; B64C 2201/128; G01S 5/0231; G08B 25/016; G08B 25/009; G08B 25/08; G08G 1/205

USPC ........... 455/404.2, 457, 456.1, 524; 379/229, 379/220.01; 705/59

See application file for complete search history.

(56) References Cited

U.S. PATENT DOCUMENTS

| | | | |
|---|---|---|---|
| 3,253,810 A * | 5/1966 | Charles | B64D 45/00 244/138 A |
| 3,500,209 A | 3/1970 | Fletcher et al. | |
| 5,218,367 A * | 6/1993 | Sheffer | B60R 25/102 340/425.5 |
| 8,625,796 B1 * | 1/2014 | Ben Ayed | H04L 63/0853 380/258 |

(Continued)

FOREIGN PATENT DOCUMENTS

| | | |
|---|---|---|
| CN | 104007451 A | 8/2014 |
| CN | 104044748 A | 9/2014 |
| FR | 2 983 833 | 6/2013 |

OTHER PUBLICATIONS

Jerry Adler, The End of the Black Box: There's a Better Way to Capture Plane Crash Data, Jun. 28, 2011, http://www.wired.com/magazine/2011/06/ff_blackboxes/, 11 pages.

(Continued)

*Primary Examiner* — Mahendra Patel
(74) *Attorney, Agent, or Firm* — Knobbe, Martens, Olson & Bear, LLP

(57) ABSTRACT

Presented herein are methods, systems, devices, and computer-readable media for recording and conveying information/data by a device. The device may record and store data associated with a catastrophic or emergency event. The device may transmit and convey data to facilitate locating the device after a catastrophic event. In some embodiments, a device may be configured to be ejected from a vehicle before or during a catastrophic event.

22 Claims, 14 Drawing Sheets

(56) References Cited

U.S. PATENT DOCUMENTS

| | | | | |
|---|---|---|---|---|
| 9,174,733 | B1* | 11/2015 | Burgess | B64D 1/12 |
| 9,311,499 | B2* | 4/2016 | Redlich | G06F 21/6209 |
| 2003/0152145 | A1* | 8/2003 | Kawakita | H04N 5/77 |
| | | | | 375/240.12 |
| 2004/0142678 | A1* | 7/2004 | Krasner | G08B 25/016 |
| | | | | 455/404.2 |
| 2007/0115174 | A1* | 5/2007 | Herrick | G01S 3/10 |
| | | | | 342/420 |
| 2007/0167147 | A1* | 7/2007 | Krasner | G08B 25/009 |
| | | | | 455/404.2 |
| 2009/0286504 | A1* | 11/2009 | Krasner | G08B 25/009 |
| | | | | 455/404.1 |
| 2012/0091261 | A1* | 4/2012 | Lee | B64B 1/50 |
| | | | | 244/33 |
| 2013/0097664 | A1* | 4/2013 | Herz | G06Q 10/10 |
| | | | | 726/1 |
| 2014/0142803 | A1* | 5/2014 | Argillier | B64D 45/00 |
| | | | | 701/33.4 |
| 2017/0069214 | A1* | 3/2017 | Dupray | G08G 5/0021 |

OTHER PUBLICATIONS

Robert Wall, Airlines Seek Standard for Black-Box Alternatives; Options under considerations as investigators continue to search for EgyptAir Flight 804 black boxes, The Wall Street Journal Online, Jun. 2, 2016, 3 pages, Dow Jones & Company, Inc.

\* cited by examiner

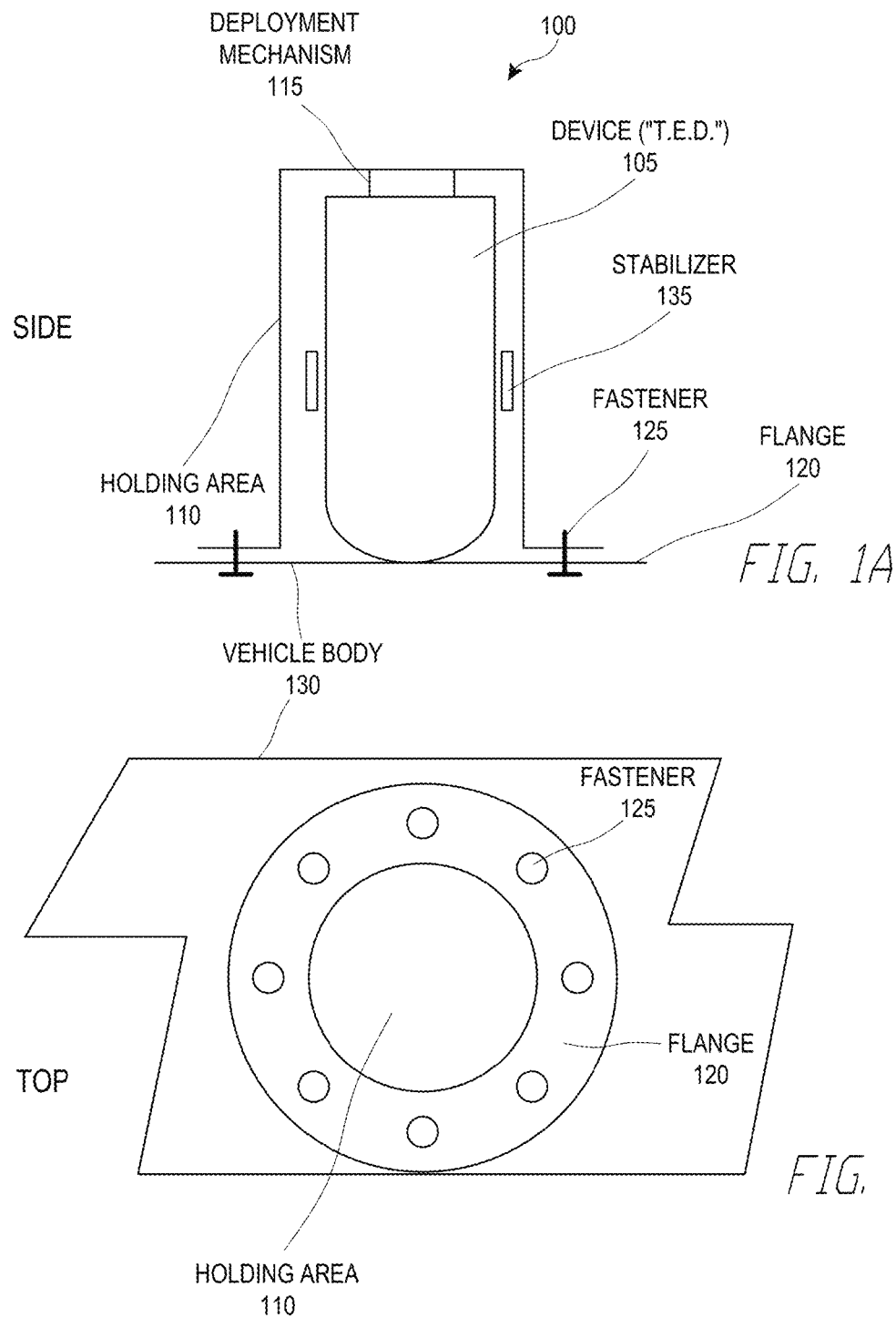

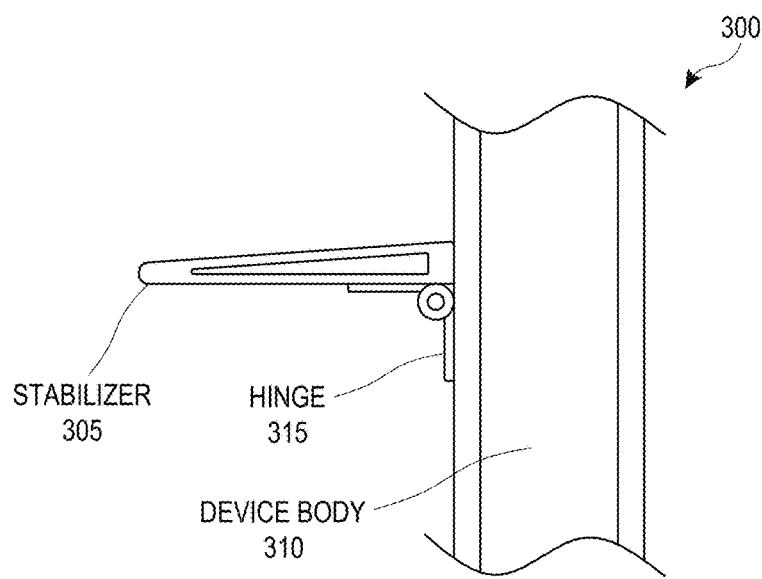
FIG. 3A
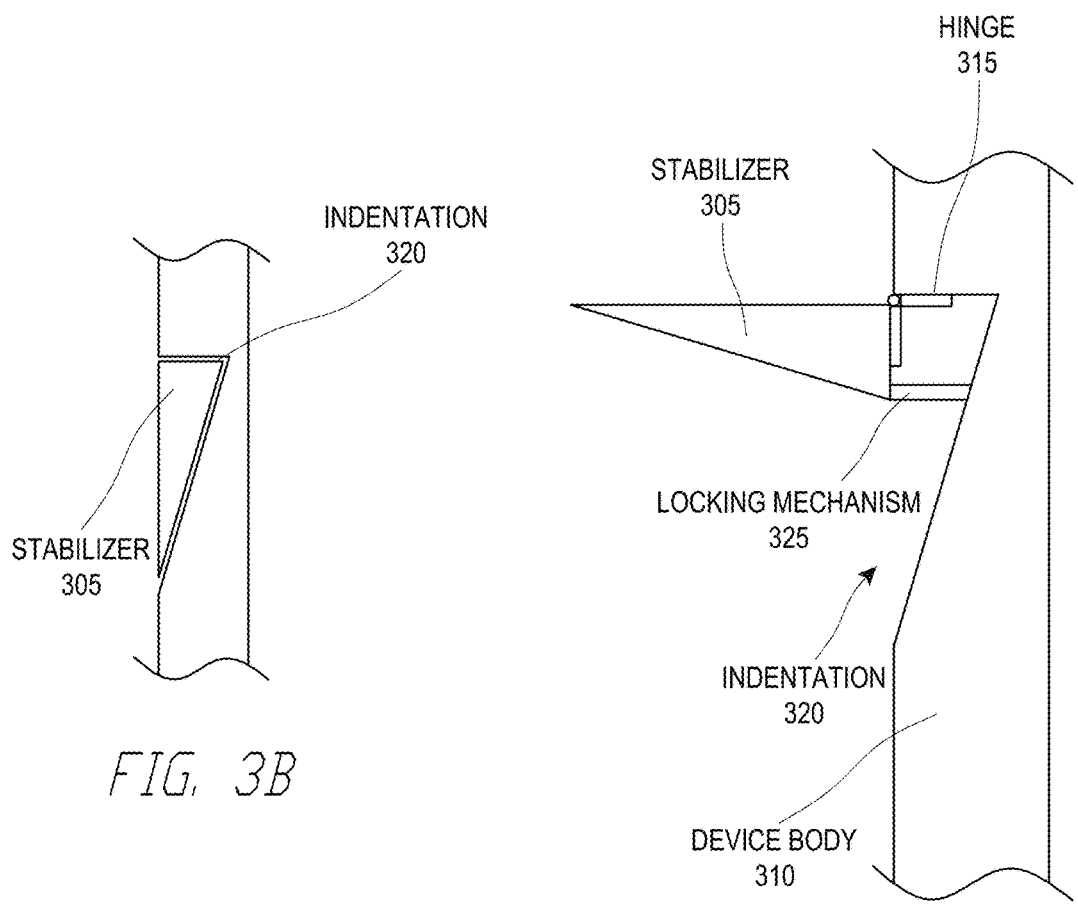
FIG. 3B
FIG. 3C

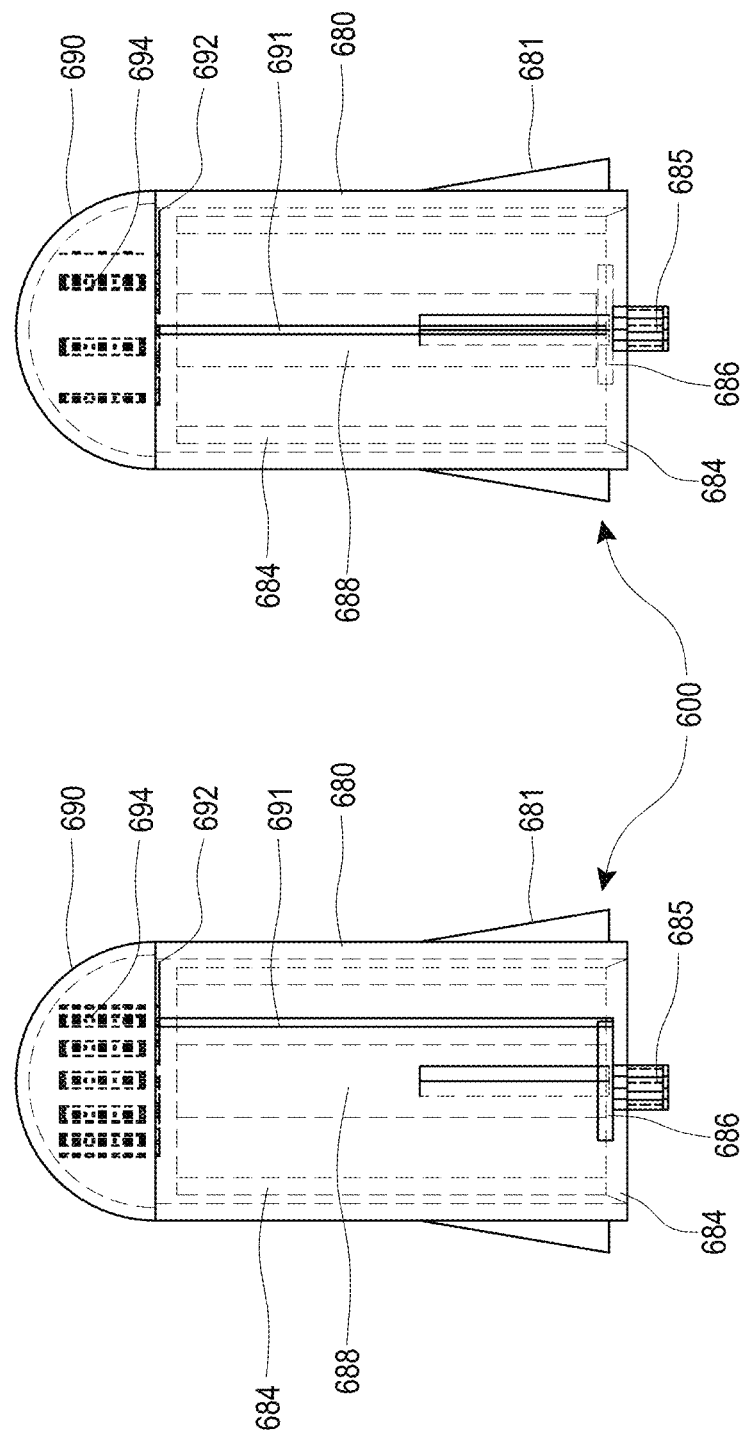

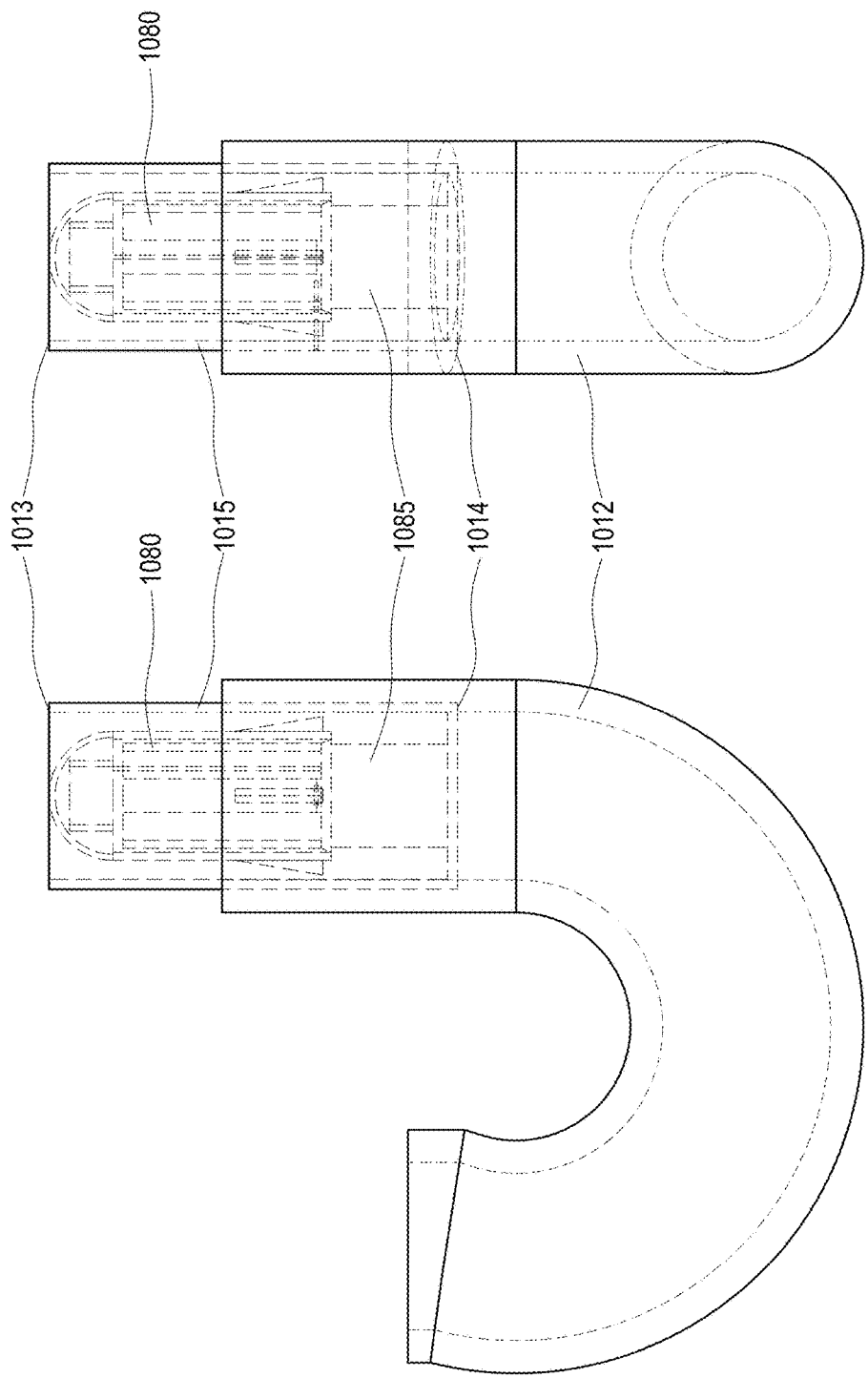

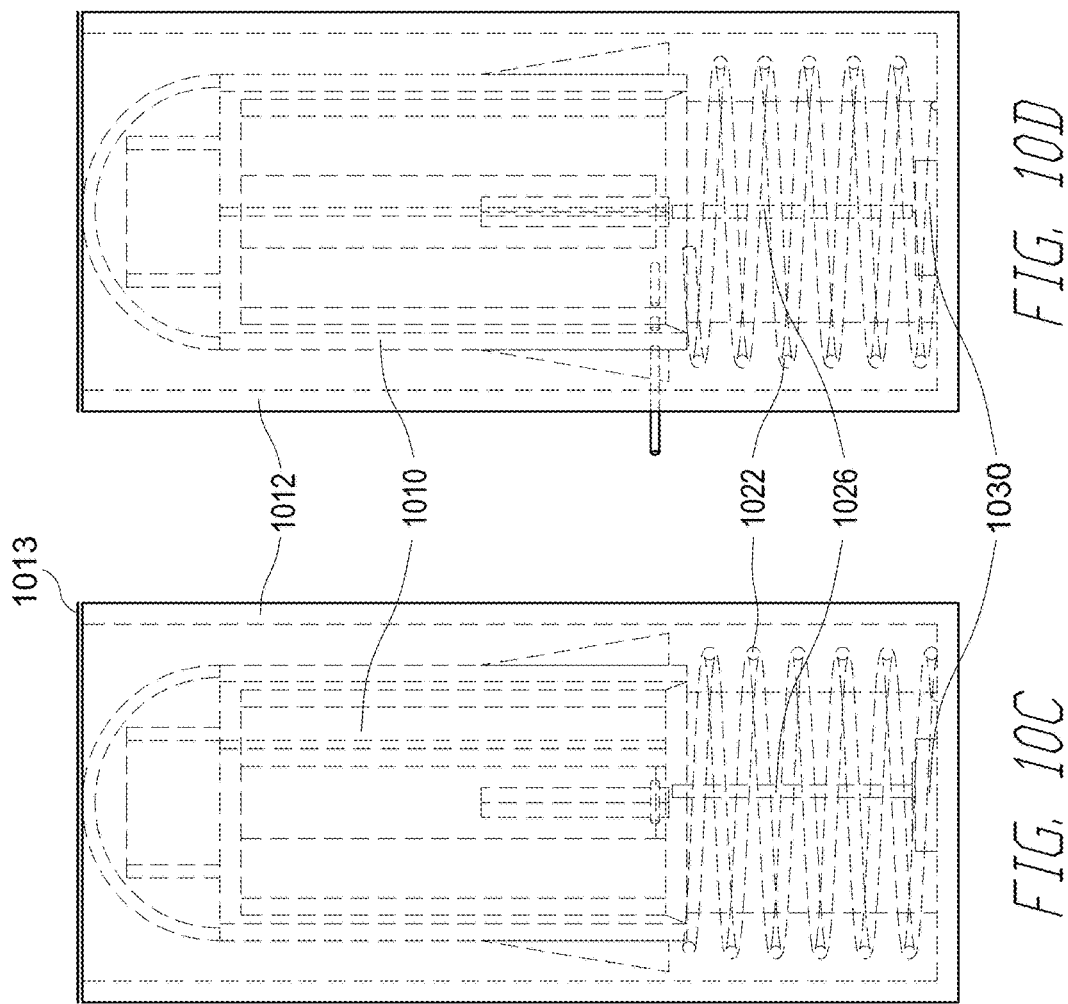

TELECOMMUNICATIONS EMERGENCY DEVICE

INCORPORATION BY REFERENCE TO ANY PRIORITY APPLICATIONS

Any and all applications for which a foreign or domestic priority claim is identified in the Application Data Sheet as filed with the present application, are incorporated by reference and made a part of this specification.

FIELD

The present disclosure herein relates to recording devices and more specifically to devices for recording information relating to vehicles or persons and conveying such information following a predetermined event or threshold, such as for example a catastrophic, emergency, or other trigger event.

BACKGROUND

Recording devices can be installed in vehicles to covertly record information during travel. For example, many planes carry a flight data recorder (FDR), also known as a "black box," to track the location of the plane, record any instructions sent to any electronic systems on the plane, record audible noises including conversations by passengers, etc. Such devices may be used for accident investigation, as well as for analyzing safety issues, material degradation and engine performance. Because such information is often particularly valuable after a crash, recording devices are often designed to withstand the force of high speed impact and the heat of intense fire.

Recording devices that may be similar in many aspects may be carried by or on the body of a person to emit a distress signal and/or preserve information about the person's condition. For example, athletes performing in adverse or hazardous conditions, such as hikers or spelunkers, may carry devices for sending a distress signal in case of an emergency. Such devices may assist in providing rescue to those affected, This Background is provided to introduce a brief context for the Summary and Detailed Description that follow. This Background is not intended to be viewed as limiting the claimed subject matter to implementations that solve any or all of the disadvantages or problems presented herein.

SUMMARY

Despite the designs discussed above, many current devices are unable to withstand a crash and/or may be pulled underwater in the event of a water landing and are unrecoverable. Moreover, because such devices remain with the vehicle during a crash, they are only found if the vehicle is found and are therefore unable to provide useful information in locating a missing vehicle.

Even where recovery is eventually successful, it is often associated with great cost, particularly where the recording devices have to be located and recovered from difficult terrain, such as the sea floor or wreckage. Similar problems often delay and impair investigations of train and maritime accidents, where recording devices are destroyed during impact, or sink into the ocean.

Accordingly, a need remains for systems and methods that make information after a catastrophic, emergency, or other trigger event faster, more easily and more reliably recoverable and/or to send out a signal (e.g. to summon help and direct responders to the location of the accident). Such devices shall be referred to as telecommunication emergency devices ("devices") in the context of this disclosure.

Presented herein are methods, systems, devices, and computer-readable media for recording and conveying information (e.g., data) by a device (e.g., a telecommunications emergency device). In some embodiments, a recording device may be configured to be separated from a vehicle (e.g. aircraft, naval vessel, land vehicle) or person (e.g. athlete, hunter) before or during (or in some cases after) a catastrophic event. The device may be designed and positioned to facilitate separation from the vehicle or person. Multiple devices may also communicate with each other to provide additional redundancy for stored information.

According to this disclosure, a system for communicating data associated with a catastrophic event for a vehicle includes one or more of the following: a housing comprising a first communication interface and a wall configured to connect to a body of a vehicle; the first communication interface is configured to receive data associated with an operating parameter of the vehicle; a telecommunication emergency device configured to be at least partially enclosed by the housing, the device comprising: a device body comprising material of greater impact strength relative to impact strength of the body of the vehicle; a second communication interface on the device body, the second communication interface configured to communicate with the first communication interface and receive the data associated with the operating parameter; a memory in the device body, the memory electrically connected to the second communication interface and capable of storing data transmitted to the second communication interface; a radio beacon configured to broadcast data associated with the telecommunication emergency device comprising information for facilitating determining location of the telecommunication emergency device; a power source capable of powering the radio beacon; a stabilizer connected to the device body, the stabilizer configured to control an aerial descent of the telecommunication emergency device when the telecommunication emergency device is propelled from the housing; a deployment mechanism in the housing, the deployment mechanism capable of propelling the telecommunication emergency device out of the housing through the body of the vehicle in response to the operating parameter; and/or deployment mechanism is activated in response to the operating parameter being indicative of a catastrophic event. The memory can be configured to store the data associated with the operating parameter of the vehicle before or during the catastrophic event for retrieval after the catastrophic event. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

According to this disclosure, the system for communicating data associated with a catastrophic event for a vehicle can further include one or more of the following: the housing comprises a flange connected to the wall, the flange extending along the body of the vehicle when connected to the body of the vehicle; the flange is configured to connect to the body of the vehicle via fasteners; the stabilizer comprises a wing connected to the housing; the wing extends substantially along a surface of the device body when the telecommunication emergency device is in the housing; upon the telecommunication emergency device being propelled out of the housing, the wing extend at least partially away from the surface of the device body; the device body comprises a recess corresponding to the wing; the wing is in the recess and substantially flush with the device body when the telecommunication emergency device is in the housing; the deployment mechanism comprises a solid fuel rocket configured to be ignited to propel the telecommunication emergency device out of the housing; a launch tube connected to the housing, the launch tube extending away from the housing to direct exhaust gases away from the telecommunication emergency device upon ignition of the solid fuel rocket; the deployment mechanism comprises a spring configured to propel the telecommunication emergency device out of the housing; the operating parameter of the vehicle corresponds to at least one of location, altitude, or speed of the vehicle; and/or the data associated with the operating parameter stored in the memory comprises location of the vehicle. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

According to this disclosure, a telecommunication emergency device for communicating data associated with a predetermined event includes one or more of the following: a communication interface configured to receive data associated with a predetermined event; a memory connected to the communication interface and capable of storing the data transmitted to the communication interface; the data associated with the predetermined event is signed for integrity of the data; a radio beacon configured to broadcast data associated with the telecommunication emergency device comprising information for facilitating determining location of the telecommunication emergency device; a power interface capable of providing power to the radio beacon, the power interface configured to connect to a power source; and/or a stabilizer configured to control an aerial descent of the telecommunication emergency device. A method of using the foregoing device is included; the method of use can include using any one or more of the foregoing features to achieve functions and/or features of the device as discussed in this disclosure. A method of manufacturing the foregoing device is included; the method of manufacture can include providing, making, connecting, assembling, and/or installing any one or more of the foregoing device features to achieve functions and/or features of the device as discussed in this disclosure.

According to this disclosure, the telecommunication emergency device for communicating data associated with a predetermined event can further include one or more of the following: signing of the data associated with the predetermined event comprises using a private key to store the data associated with the predetermined event onto the memory; the private key is deleted after it is determined the predetermined event has occurred; signing of the data associated with the predetermined event comprises using a public key to access the data after the private key is deleted; the data associated with the predetermined event stored on the memory corresponds with at least one of location, altitude, or speed of a vehicle that the telecommunication emergency device is associated with; the data associated with the predetermined event stored on the memory corresponds with at least one of heart rate, breathing rate, blood oxygen, or temperature of a person that the telecommunication emergency device is associated with; the communication interface is configured to communicate with one or more sensors to receive from the one or more sensors the data associated with the predetermined event; a sensor configured to detect at least one of acceleration or altitude of the telecommunication emergency device to facilitate determining whether the predetermined event is imminent or occurring; a Global Positioning System (GPS) module; the GPS module locks in the location of the telecommunication emergency device upon occurrence of the predetermined event; solar panels configured to charge the power source; an illumination beacon configured to pulse periodically after the predetermined event to facilitate locating the telecommunication emergency device; the radio beacon is configured to transmit a sweeping directional beam to facilitate locating the telecommunication emergency device after the predetermined event; and/or the power source comprises a capacitor. A method of using the foregoing device is included; the method of use can include using any one or more of the foregoing features to achieve functions and/or features of the device as discussed in this disclosure. A method of manufacturing the foregoing device is included; the method of manufacture can include providing, making, connecting, assembling, and/or installing any one or more of the foregoing device features to achieve functions and/or features of the device as discussed in this disclosure.

According to this disclosure, a telecommunication emergency device for communicating data associated with a predetermined event includes one or more of the following: a communication interface configured to receive data associated with a predetermined event; a memory connected to the communication interface and capable of storing the data transmitted to the communication interface; the data is protected to inhibit unauthorized access to the data or tampering with the data; a radio beacon configured to broadcast data associated with the telecommunication emergency device for facilitating determining location of the telecommunication emergency device; and/or a power interface capable of providing power to the radio beacon. A method of using the foregoing device is included; the method of use can include using any one or more of the foregoing features to achieve functions and/or features of the device as discussed in this disclosure. A method of manufacturing the foregoing device is included; the method of manufacture can include providing, making, connecting, assembling, and/or installing any one or more of the foregoing device features to achieve functions and/or features of the device as discussed in this disclosure.

According to this disclosure, a plurality of telecommunication emergency devices may be provided. The plurality of telecommunication emergency devices may be configured to communicate with each other. At least one telecommunication emergency device of the plurality of telecommunication emergency devices may redundantly store data associated with at least one other telecommunication emergency device of the plurality of telecommunication emergency devices. A method of using the foregoing devices is included; the method of use can include using any one or more of the foregoing features to achieve functions and/or features of the devices as discussed in this disclosure. A method of manufacturing the foregoing devices is included; the method of manufacture can include providing, making, connecting, assembling, and/or installing any one or more of the foregoing features of the devices to achieve functions and/or features of the devices as discussed in this disclosure.

According to this disclosure, a system for communicating data associated with a catastrophic event for a vehicle includes one or more of the following: a separation mechanism configured to mechanically separate the device from a vehicle; a communication interface configured to receive data associated with an operational parameter of the vehicle; a separation controller configured to detect, based at least in part on the data, a likelihood of a predetermined event and activating the separation mechanism in response to the likelihood of the predetermined event exceeding a threshold; a memory connected to the communication interface and capable of storing the data transmitted to the communication interface; and/or a radio beacon configured to broadcast data associated with the telecommunication emergency device for facilitating determining location of the telecommunication emergency device. The memory can store the data associated with the operating parameter of the vehicle before or during the predetermined event for retrieval after the predetermined event. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

According to this disclosure, a system for communicating data associated with a catastrophic event for a vehicle includes one or more of the following: a communication interface configured to receive data associated with a predetermined event; a memory connected to the communication interface and capable of storing the data transmitted to the communication interface; and/or a radio beacon configured to broadcast data associated with the telecommunication emergency device for facilitating determining location of the telecommunication emergency device. The memory may store the data associated with the predetermined event before or during the predetermined event. The data may be at least one of cryptographically signed or encrypted before being written to the memory using a secret key. The secret key may be deleted after the predetermined event. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

According to this disclosure, a system for preserving data related to a vehicle includes one or more of the following: a communications link configured to receive information from the vehicle related to an operation of the vehicle; a separable unit comprising: a storage medium; a radio beacon; a recorder, configured to write at least a first subset of the information to the storage medium; and/or a separation controller configured to: determine an indication of a catastrophic event related to the vehicle, based on at least a second subset of the information; and/or determine an indication of a catastrophic event related to the vehicle, based on at least a second subset of the information; and/or a launcher, configured to separate the separable unit from the vehicle. The launcher comprises may be solid-fuel rocket. the launcher may be a spring. The vehicle may be an aircraft. The second subset may be information related to a terrain proximity of the aircraft provided by a Terrain Awareness and Warning System (TAWS). The second subset comprises information related to a proximity to other aircraft provided by an Airborne Collision Avoidance System (ACAS). At least part of the information may be redundantly stored on one or more devices in a plurality of the devices. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

According to this disclosure, a method for preserving data in an emergency event includes one or more of the following: attaching a separable unit, comprising a storage medium and a radio beacon, to a vehicle; receiving information from the vehicle related to an operation of the vehicle via a communications link; recording at least some of the information to the storage medium; and/or determining an indication of a calamity related to the vehicle based on at least some of the information. Upon detection of the indication of the emergency event, mechanically separating the separable unit from the vehicle. A method of using the foregoing system is included; the method of use can include using any one or more of the foregoing features to achieve functions and/or features of the system as discussed in this disclosure. A method of manufacturing the foregoing system is included; the method of manufacture can include providing, making, connecting, assembling, and/or installing any one or more of the foregoing system features to achieve functions and/or features of the system as discussed in this disclosure.

The Summary is provided to introduce a selection of concepts in a simplified form that are further described herein in the Detailed Description. This Summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIGS. 1A-1B illustrate an exemplary system configured to launch and/or eject a device 105, according to some embodiments.

FIGS. 3A-3C illustrate exemplary stabilizers for a device, according to some embodiments.

FIGS. 6B-6C are various views of an exemplary device as may be carried on an aircraft, according to some embodiments.

FIGS. 10A, 10B, 10C and 10D illustrate various exemplary mechanisms for separation of a device from a host vehicle or operator.

DETAILED DESCRIPTION

Figure 1C:
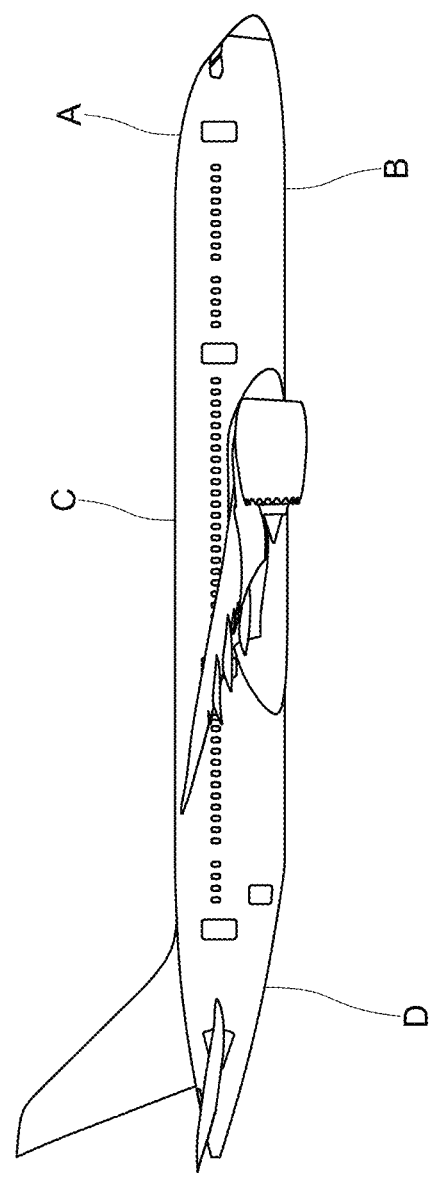
FIG. 1C illustrates example locations of the device in an example vehicle like an airplane, according to some embodiments.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

Applications and Terminology

Devices may be useful for installation in the context of any type of vehicle, whether human-occupied or not. For example, devices may be useful with various aircraft, such as airplanes, helicopters, drones, airships and balloons. Devices may be useful with various land craft, such as cars, trains, motorcycles, motorsports and racing vehicles. Devices may also be utilized in the context of various types of watercraft, such as ships, personal watercraft ("jet-ski"). Such vehicles may collectively be referred to as "host vehicles", including its broad and ordinary sense, for the purpose of this disclosure.

Another application of devices is for carrying on an individual, such as for example, a swimmer, diver, hiker, climber, military personnel or other person exposed to potentially adverse conditions. For the purposes of this discussion, such an individual equipped with or connected to a device shall be referred to as an "operator". A device designed for being carried on or near the body of a person, rather than on a host vehicle, may be referred to for the purposes of this disclosure as "person-portable" or "person-carried", including its broad and ordinary sense, for the purpose of this disclosure, and irrespective of whether the operator is a man, woman or child.

Host vehicles and operators may be exposed to various adverse events that may make it desirable to record or store information, or to convey information outside the vehicle, for example because it puts the survival of the host vehicle or operator in jeopardy, and/or because it calls for outside assistance. These adverse events may be specific to the type and activity of host vehicle or operator: For example, an aircraft may suffer an in-flight structural failure, a mid-air collision, or a collision with terrain. A ship may capsize or sink, a mountaineer may become trapped in an ice crevice, military personnel may be wounded by gunfire, and a swimmer may become incapacitated from cold. Such events may be referred to as "catastrophic events", including its broad and ordinary sense, for the purposes of this disclosure.

Devices may be configured to deploy, detach, eject or otherwise remove themselves or be removed from the host vehicle or the operator, for example before or during a catastrophic event. This process may be referred to as "separation", including its broad and ordinary sense, in the context of the present disclosure and may be facilitated by various means, including pyrotechnic ejection charges, springs and gravity dropping discussed herein. Advantageously, separation may happen before or during a catastrophic event, thus increasing the chance that the device is not affected by the catastrophic event and remains able to retain and relay information, and to broadcast signals that may be received by potential responders.

It may be desirable to trigger separation close to a catastrophic event in time, so that the device remains with the host vehicle or operator long enough to record valuable information just before a catastrophic event unfolds. As such, it may be desirable to use a variety of events, triggers or conditions to induce separation; these maybe collectively referred to as "separation triggers", including its broad and ordinary sense, in the context of the present disclosure. The separation triggers may be dependent on the host vehicle or operator; for example, for an aircraft, unsafe proximity to terrain may be a potential separation trigger, while for an operator, loss of vital signs may be a separation trigger.

Multiple devices may be configured to exchange data. This may be advantageous, for example, to provide for increased redundancy by redundantly storing information from one device on another. Such device-to-device communication, signaling or networking shall be referred to as a "mesh" configuration, including its broad and ordinary sense, irrespective of how it is implemented on the network level (e.g. using an actual mesh, or a point-to-point topology).

Structure

To maximize survivability of the device after separation, various manufacturing techniques and design elements may be used. For example, the device may be enclosed in a housing made out of a rigid and tough material, such as stainless steel or high-density polypropylene. The housing may feature an internal cavity inside that accepts the various components of the device, such as the radio transmission circuitry, power storage, antenna, and memory. To reduce susceptibility to shock and damage by fluid ingress, the cavity may be filled with a solid or gelatinous compound, such as epoxy resin, after the components are placed. This process may be referred to as potting. The cavity and density of the shell may be appropriately sized so that, considering the overall density of the device, the device remains buoyant in water. The cavity may be closed by a cap joined, for example, welded, to it after the components have been placed and the potting compound applied. Alternatively, the entire casing may be cast around the potted components. The device may then be inserted into a launch tube or assembly, which may be rigidly attached to the host vehicle. The launch tube may contain components, such as a pyrotechnic ejection device, that allows the device to be propelled out of the tube and thus separated from the host vehicle or operator.

Separation Triggers

Separation may be caused as soon as the device, or another device, detects a catastrophic event upon a separation trigger, i.e. a condition related to a catastrophic event affecting the host vehicle or operator, arising.

For example, on an aircraft, separation triggers may be related to an aircraft's low altitude while not in a landing configuration (e.g. 100 feet AGL (above ground level), 200 feet AGL, or 400 feet AGL). This information may be provided by, for example, a radar altimeter or a GPS receiver.

Some aircraft may enter uncontrollable flight conditions outside their rated flight envelope from which they may not be recoverable, such as a high-speed stall. Accordingly, separation triggers may be provided by an unrecoverable flight condition, such as a high-speed stall, being detected, e.g. by detecting combinations of airspeed, pitch, yaw and altitude that may indicate an unrecoverable flight condition. Additional separation triggers may be provided based on unusual or hazardous flight conditions, even where not necessarily irrecoverable, such as a low-speed stall, spin, or dive less than 1000 feet AGL.

Other separation triggers may be related to an unsafe proximity to other aircraft or terrain. For example, separation may be initiated when a collision with another aircraft or with terrain is estimated to occur in, for example, 2 seconds, 1 second, or 500 ms. Advantageously, this information may be provided by systems that may already exist, particularly in larger aircraft. Terrain proximity information may be provided by a Terrain Awareness And Warning System (TAWS) that may calculate the aircraft's position relative to surrounding terrain by combining an electronic database of terrain features with information about the aircraft's position trajectory, as obtained from satellite navigation or aircraft sensors, such as an altimeter. Advantageously, by utilizing the information from a TAWS system, separation triggers may be provided without installing additional equipment to detect unsafe terrain proximity.

Similarly, aircraft may receive information related to other aircraft in their proximity from an Airborne Collision Avoidance System, commonly implemented by a receiver that picks up on signals from other aircraft containing their position, altitude and course, and combines it with the receiving aircraft's trajectory and position to determine the receiving aircraft's proximity to other aircraft. Advantageously, this information may be utilized to determine unsafe proximity to other aircraft and trigger separation when such unsafe proximity is detected; for example, separation may be triggered when the Airborne Collision Avoidance System detects an imminent mid-air collision with another aircraft in less than 3 seconds, in less than 2 seconds, or in less than 1 second.

Some aircraft and watercraft may be equipped with radar and/or lidar, and some watercraft may be additionally equipped with sonar. These sensors may also provide information about unsafe proximity to other aircraft, terrain, or other hazards and appropriately be used to trigger separation. For example, a radar system may be used to trigger separation when a collision with another aircraft is imminent. Similarly, sonar may be used to determine when a collision between a ship and an underwater obstacle is about to occur.

Advantageously, by connecting the device to existing measurement devices and systems, for example by connecting the device to an existing vehicle bus, data to determine separation triggers can be provided without requiring redundant measurements. Additionally or alternatively, the device may be provided with its own sensors; for example, the device may comprise its own acceleration sensor, temperature sensor and GPS receiver to determine some or all of its separation triggers.

For person-portable devices, various sensors may be used to infer, detect, and/or determine threatening conditions related to the operator's health; for example, breathing rate, heart rate, temperature and/or blood oxygen may be monitored. Advantageously, existing measurement devices, such as a pulse watch, may be used to provide information for separation. Additionally, a trigger or release may be provided through which the operator may manually cause separation, for example when a life threatening or adverse event occurs that is not detected by the sensors.

Because not all measurements received by the device may be accurate, it may not be desirable to trigger separation based on a single value meeting a separation trigger. As such, the device may use computational methods to combine various measurements to reduce the uncertainty of the combined value below the uncertainty of its constituent values. For example, the device may use Kalman filtering (including extended Kalman filtering) to estimate its altitude based on inputs from a GPS receiver, measurements from a barometric altimeter, a gyroscope, an accelerometer and/or other sensors, thus determining altitude with lower error than if only individual values were considered.

Separation Mechanisms

Separation may be triggered by the device itself, or by a signal from a host vehicle or operation by an operator. Depending on the type of application, various means of separation may be provided. For example, for an aircraft, it may be sufficient in some instances to provide gravity-assisted separation, by opening a latch or flap on the bottom of the host vehicle, through a mechanical release mechanism, such as a three-ring release mechanism. It may be desirable to provide for an additional source of power to provide for faster and more reliable separation. For example, the device may be spring-loaded, so that it is pushed out of the host vehicle by expansion of a compressed mechanical or pneumatic spring. Advantageously, this may allow for more rapid divergence between the device's and the host vehicle's trajectory, thus reducing the chance that the device is affected by a catastrophic event affecting the host vehicle, and also reducing the chance of the host vehicle hitting the device after separation.

Separation of the device may be accomplished by various means, including chemical propellants, a mechanical or pneumatic spring, or a simple gravity release, for example triggered by removal of a bolt or rotation of an electrically operated locking cam. Advantageously, the use of chemical propellants allows for rapid separation of the device from the aircraft, thus maximizing the probability that the device will not be affected by a catastrophic event affecting the aircraft. Additionally, chemical propellants may provide sufficient force to ensure separation even in adverse conditions, such as highly unusual attitudes as may be encountered by an aircraft in distress, and high aerodynamic forces. The separation mechanism may be triggered by the device in various ways, for example by a mechanical bolt being released through a small pyrotechnic charge triggered by an electrical impulse from the device, or an ejection tube being blown open by the rise in pressure generated by a pyrotechnic gas generator. Where a chemical propellant is being used to provide separation, the chemical propellant may be triggered from the device by an electric impulse fed into a blasting cap or similar priming mechanism for the chemical propellant.

Chemical propellants may be used in various ways to accomplish separation. For example, the device may be provided with a solid-fuel rocket motor that is ignited when separation is triggered. Alternatively, a pyrotechnic gas generator (e.g. sodium azide gas generator) may be provided that pressurizes a launch tube, from which the device is then launched away from the host vehicle. The launch tube may be rigidly attached to the host vehicle or to a container structure, such as a backpack, carried by an operator. The launch tube may be rigidly sealed until separation, thus protecting the device until separation.

Using a pyrotechnic or rocket-based method of separation may, in addition to separating the device faster, also allow the device to gain altitude upon separation. This may be particularly advantageous for water and land vehicles and person-carried devices, where it may increase the chance that its distress call will be received. For example, a signal transmitted to a satellite as discussed herein may not be observed if there is no direct line of sight to a satellite. When a device is released by a vehicle or operator in a canyon, below dense foliage, in mountainous areas, and other geographic areas where line of sight to satellite may be difficult to establish, the beacon radio call may not be observed, or it may only be observed after significant time has passed, when a satellite happens to be directly overhead. By utilizing a rocket or other type of propellant charge to fire the beacon towards the sky, the device may be able to rise above the features of surrounding terrain, establishing line of sight to satellites that are obscured by terrain or foliage and/or lower on the horizon and thus maximizing the chance that its distress call will be observed. In an alternative embodiment, the beacon may utilize a balloon, such as a helium balloon, to float towards the sky.

Where the device is intended to separate upon a catastrophic event occurring to an individual operator, it may be provided as part of a system comprising the device in a suitable transport means, for example, a backpack, together with one or more sensors attached to the operator and wirelessly or through wires connected to the device. For example, the operator may wear a heart rate sensor and/or an infrared body temperature sensor on his or her wrist, a blood oxygen sensor on his or her skin, and/or a conductive body temperature sensor in his or her rectum, monitoring various vital signs such as heart rate, blood oxygen, blood pressure, rate of breathing, and body temperature. Separation triggers may be configured upon one or more vital signs deviating from an acceptable range. Additionally, a separation trigger may be manually set by an operator, such as, for example, by an activation mechanism, such as a button, worn on an operator's body and/or advantageously, included with one or more of the sensors discussed herein.

Connection to Host Vehicle

The device may continuously receive data from the host vehicle, in which it is installed, both for recording for preservation in the event of a catastrophic event, and for triggering the separation process where appropriate. For example, in an airliner, the system may be connected to one or more internal avionics buses, or may be connected to various sensors or flight instruments, for example a GPS sensor, or a pitot-static altimeter, directly. The connections between the device and the host aircraft may be designed so as to allow for quick release in the event of separation; for example, wire connections between the device and the host aircraft may be fashioned as sliding connectors or contactless (e.g. inductive) connectors.

In an embodiment, all data and signals transmitted from the host vehicle to the device may be multiplexed, or combined, into a transmission through a single wire, so as to minimize the number of wires required to be connected to the device. This wire may then be connected to the device so as to allow quick and unhindered release when the device is to be separated. For example, the wire may be made out of a relatively thin material, and may be designed together with the release mechanism to be ruptured when the device is separated. Alternatively, the wire may be connected through the use of quick-release connectors, so as to allow for non-destructive removal of the connection between the device and the host aircraft.

To establish the data connection and the power supply from the vehicle to the device, inductive or capacitive coupling may be used. Advantageously, the use of inductive or capacitive coupling may allow for contactless, or low-contact, transmission of both power and data. For example, the device may include a resonant inverter circuit that is powered from an alternating current provided by the aircraft through a wire. Advantageously, this may reduce or eliminate the need for a mechanical connection between the host vehicle and the device.

When a resonant inverter topology is used for providing power to the device, the same circuit can be used for data transmission, for example, by modulating the data upon the AC waveform provided by the aircraft to the device's resonant inverter. Alternatively, a separate connection, e.g., a circuit that is not capacitive or inductively coupled, may be used to provide data.

In the scenario of a person-carried device, direct connections (e.g. wire connections) may be made from the device to various sensors. For example, a heart rate sensor and a body temperature sensor may be connected to the device, supplied with power from the device, and continuously transmit data from the wearer to the device. Alternatively, a wireless connection, such as a Bluetooth connection, may be used to connect one or more sensors to a person-carried device. Advantageously, this may allow the device to work together with various existing or future third-party sensor devices, including wearable sensor device, for example wearable Bluetooth-enabled pulse sensors.

Integrated Data Acquisition

In addition or instead of recording data from externally connected sensors, the device may also comprise internal sensors. Advantageously, this may allow the device to keep recording even after a connection to external sensors is lost. For example, the device may comprise an accelerometer, such as a high-frequency three-axis accelerometer, and/or a gyroscope, which may be recorded and processed to provide information and separation triggers related to potentially hazardous conditions such as free fall and excessive shock. The device may comprise an ambient pressure sensor or barometer, which may be recorded and processed to provide information and separation triggers related to potentially hazardous conditions such as decompression, immersion in liquid, explosions and barometric altitude. The device may also comprise additional sensors which may be related to particular hazards expected to be encountered by the host vehicle or operator; for example, a device designed for an operator or host vehicle operating where nuclear processes may occur may comprise sensors to detect radiation hazards, such as a scintillation counter. In an embodiment, the device may be responsive to separation triggers from both external and internal sensors. Advantageously, by including internal sensors with the device, the device may be designed as a single functional unit designed to be worn by an operator that provides recording capabilities without being connected to any external device. In some embodiments, the device may comprise internal sensors, but may additionally be connected to external sensors.

Data Recording

When mounted in a host vehicle, the device may be connected to a vehicle data bus, and thus record all, or an appropriately selected subset of, the information provided through the vehicle data bus. For example, when used in an airplane, it may record all or some information from the aircraft instrument including air speed, attitude, control inputs by the pilot, system component failures, and other information.

The device may additionally or alternatively be directly connected to other sensors and components, such as a conventional flight recorder or cockpit voice recorder, duplicate the information stored in these devices, and thus, for example, record sounds and conversations audible in the cockpit. Additionally, the device may be provided with its own sensors, for example, a GPS receiver operating independently of the aircraft's GPS receiver, and may also record this information.

Data may also be recorded from directly-connected external sensors, or integrated sensors as discussed herein. Particularly advantageous in the context of a person-portable device, this may include wearable sensors, such as heart rate sensors and pulse oximeters. The device may poll one or more externally connected or internal sensors in regular intervals that may depend on the type and/or the last reading of the sensor and may balance the need for frequent, accurate data acquisition with the need to conserve energy and storage capacity; for example, an accelerometer may be polled, for example, at a rate of 125 Hz to detect transient shocks, wherein a heart rate sensor may be polled, for example, every 2 sec to conserve energy. Advantageously, not all readings of sensor data may need to be recorded; for example, data may be processed at one resolution to detect possible separation triggers, and be recorded at a different (e.g. a reduced) resolution. For example, accelerometer data may be received and processed at 125 Hz to detect transient shocks and trigger separation based thereon, but may be recorded at a rate of 1 Hz. Other polling rates or intervals may be used as appropriate for the sensor to be used; for example, a sensor may be polled at a rate of 1 Hz, 2 Hz, 0.5 Hz, 5 Hz, 0.01 Hz, 20 Hz, 100 Hz, 200 Hz, 1000 Hz.

The device may record on any type of analog or digital medium that is appropriate for the contemplated usage scenario. For example, flash memory, specifically, single level cell (SLC) flash memory, may be used for recording. Advantageously, the use of SLC flash memory provides for digital recording capability without mechanically moving parts, and thus may allow for good survivability and useful life of the device.

Advantageously, the recording may be performed in a cyclic fashion, so that when a device's memory is getting full, it overwrites the oldest recording (last in first, first out (LIFO). This can help ensure that, at the time of separation, the latest and thus potentially most relevant information is preserved. Various measures may be taken to further increase the survivability of the recording, even in the event of partial failure of the memory components; for example, techniques known in the art of computer processing, such as checksumming (e.g., cyclic redundancy checking), mirroring, and a combination of both may be used.

To deter unauthorized finders of the device after separation from accessing the information stored thereon, and preserve the integrity or authenticity of the data by preventing modification of the stored information after separation, cryptography, particularly cryptographic signatures and/or encryption, may be utilized. Information integrity and confidentiality may be cryptographically ensured by signing the recorded data, or a cryptographic hash of the recorded data, using any suitable public key cryptography system (for example the RSA system or an elliptic curve cryptography [ECC] system, in combination with a cryptographic hash function known in the art, such as SHA-256 or Whirlpool). Specifically, a private/public key pair may be generated inside the device upon manufacturing, where the public key is retained outside the device, for example, by the airline or by a national aviation authority. The private or secret key remains associated with the device and is used to cryptographically sign and/or encrypt each record as it is added to the device's storage.

It will be appreciated that encryption of the data may be performed, e.g. for performance reasons, in multiple steps. For example, a random block key may be generated, e.g. at the beginning of a recording, which is stored encrypted by the private key and is then used to encrypt the recorded data using a symmetric cipher, such as AES-Rijndael or RC4.

Upon separation, the private key is deleted. Advantageously, this allows the data stored inside the device to be decrypted by and verified against the public key, thus making sure that the information has not been altered after separation, but no new information can be added after separation because the private key no longer exists.

Encryption may alternatively be performed by using a symmetric cipher (e.g. a symmetric block cipher, such as AES-Rijndael, or a symmetric stream cipher, such as RC4), wherein the symmetric key is programmed into the device upon manufacturing, and a copy is again stored by a third party outside the device, for example, by the airline. Because the symmetric key is deleted from the device upon separation, the data from the device cannot be read unless the independently reserved copy of the key is available.

In an embodiment, the device may further utilize hardware barriers, such as, for example, a keypad, fingerprint scanner, retinal scanner, facial recognition scanner, and/or the like wherein a code must be entered or other credential entered/identified before data can be retrieved from the device's memory. This may allow for additional security in the event that the cryptography used for securing the data is broken. If the code is entered incorrectly several times, the device may comprise logic to erase itself.

Beaconing

To increase the chances of the device being found and recovered after a catastrophic event, it may be advantageous to provide for one or more radio beaconing mechanisms. These mechanisms may serve various functions, including allowing for triangulation, or the use of radio direction finding equipment, to locate the device by homing in on a radio signal broadcasted by it.

The radio signal may also broadcast information identifying the device, or its location; for example, the device may broadcast the GPS location at the time separation has occurred, and an identification of a host vehicle or operator, such as, for example, an aircraft's tail number or call sign, a ship's call sign, or an operator's name. This may allow the device to be located even without the use of radio direction finding equipment by searching an area surround the broadcast GPS location, and may also facilitate a rapid search and rescue response since the transmission indicates the vehicle or operator from which separation has occurred and which may have thus suffered a catastrophic event.

It may be advantageous to utilize a sweeping, directional beam for radio beaconing. Compared to an isotropically radiated signal, a sweeping directional beam provides more power momentaneously and thus may allow for easier reception of the radio beacon broadcast. A sweeping directional beam may be implemented by using a moving directional antenna. This may provide the advantage of keeping the necessary radio transmission circuitry simple, but increases the mechanical complexity of the device. A sweeping directional beam may thus advantageously be implemented by using a phased array antenna system. By using multiple antenna elements that are driven with appropriate phase offsets with respect to each other, the directionality of the beam may be controlled without moving the antenna. Advantageously, this may allow the beam to be swept without requiring any mechanical movement inside the device. The use of phased array antenna techniques may allow for the beam to be swept in one plane (around an azimuthal axis), or in two planes (around an azimuthal axis and an elevation axis). For example, when the beam is swept azimuthally, i.e., cylindrically around the device, the radiation pattern of the device may be comparable to a lighthouse, tracing out a full circle every, for example, five seconds. Where the beam is swept in three dimensions, azimuth and elevation may be controlled so as, for example, to trace out a spiral pattern around the device. Advantageously, in both the two dimensional and the three dimensional case, the directionality of the beam may be controlled so that, on average, the intensity of the radiated signal is isotropic.

Various antenna designs may be used as appropriate for the desired directionality and frequency of the omitted signal. It may be advantageous to avoid the use of antennas that require mounting external to the device, so as to contain all structures inside the housing of the device and thus increase survivability. This advantage may be provided by the use of a patch or strip antenna. Advantageously, this allows the antenna to be fabricated in a slim, planar profile, that may be entirely contained within the housing of the device and thus avoid the need for external antenna attachments.

This type of antenna may advantageously be integrated with the use of a phased array antenna system, as discussed herein. Advantageously, the use of multiple phased array microstrip antenna elements may allow the multiple antenna elements required for a phased array to be located on a single circuit board mounted entirely within the housing of the device. Advantageously, the device may use an acceleration sensor or other type of sensor allowing it to determine its orientation with respect to the ground, and modify the directionality of the beam so as to direct the beam away from the ground. This may allow for maximizing the energy radiated towards the sky, where aircraft and satellites have the greatest chance of receiving the signal, while minimizing the amount of energy wasted through dissipation in the ground.

The radio beaconing functionality may operate on one or more frequencies. For example, the radio beaconing may operate on 121.5 MHz, 243 MHz, and 406 megahertz, thus utilizing frequencies that are likely to be monitored by satellites, other aircraft, and authorities. By broadcasting an appropriate signal on 406 MHz, the beacon may communicate with the Sarsat satellite system, thus facilitating rapid reception of the beacon signal even in areas where no terrestrial radio coverage exists. Advantageously, the beacon may transmit on at least one satellite frequency, such as 406 MHz, and at least one frequency typically monitored by terrestrial receivers, such as 121.5 MHz, to increase the chances of being received. Advantageously, the use of a distress frequency reserved for distress calls may reduce the chance of the beacon's transmission being blocked by other radio traffic.

Additionally, a strobe light or other type of visible-light beacon may be mounted to the device. Advantageously, light-emitting diodes (LED) light sources may be used to provide for high light output without unduly draining the device's energy reserve. Advantageously, the LED light sources may be configured in strip configurations arranged radially around a major axis of the device; for example, there may be a pattern of 2, 3, 4, 5, 6, 7, 8 or 10 LED strips arranged around a major axis of the device.

Power Supply

Before separation, the device may be powered from the onboard power supply of a vehicle. For example, on an aircraft, the device may be connected to the onboard DC supply so as to allow it to charge its internal power storage during normal operation of the airplane.

To ensure that the device is ready to perform its intended functions after separation, the device may include an internal power supply. For example, the device may be powered by a nonrechargeable battery, a rechargeable battery, or a capacitor. The person-portable devices may be powered via, for example, commercially available batteries that connect to the device via a power interface as discussed herein.

The use of a nonrechargeable battery may reduce the need to connect the device to the power supply of a vehicle to keep the battery charged. The battery may be periodically replaced due to self-discharge and the device's own power drain while in standby mode. For example, a nonrechargeable battery may be used with person-portable devices.

The use of a rechargeable battery may allow the device battery to be kept charged by the host vehicle's power supply (e.g. through float charging).

In some instances, it may be possible to increase survivability, particularly with respect to extreme temperatures and accelerations, by using a capacitor with or instead of a battery. Because a capacitor may be less sensitive to changes in temperature, for example, due to its reduced reliance on mass flow for energy release, the use of a capacitor may allow the device to function for extended periods of time even while in extremely hot or cold conditions after separation. The capacitor may be kept on floating charge from the host vehicle's power supply until separation occurs. Advantageously, capacitors with particularly high capacitance, such as electric double-layer capacitor or electrochemical pseudocapacitors (e.g., supercaps) may be used.

To allow for continued operation of its beaconing equipment, the device may also, in addition to the energy storage types previously discussed, incorporate solar cells. Advantageously, the use of solar cells may allow for almost indefinite operation after separation when exposed to sufficient sunlight. The solar cells may be used to charge the internal power storage, such as a battery or capacitor, and/or may power the beaconing facilities directly. Advantageously, the solar cells may also be used as stabilizers during the descent phase of the device, as discussed herein.

Aerodynamic Stabilization and Deceleration

It may improve the survivability of the device, especially if ejected from an airborne host vehicle that may operate at great altitude and at high airspeeds, or if separated through pyrotechnic or rocket propulsion means, to include some type of mechanism that allows for controlled acceleration and stabilization during its descent to the ground.

When separated through a rocket, stability in flight may be provided by allowing part of the exhaust gas to escape normal to the intended direction of flight, thus putting the device into a spin. Additionally, the device may utilize one or more fins, ailerons, wings, winglets or other type of surfaces affecting its aerodynamic behavior to dissipate some of its velocity while descending (e.g., control the devices aerial descent). Advantageously, the use of such surfaces may also make the descent path of the device more predictable and less dependent on winds and the velocity at separation, and thus further reduce the space which has to be searched after a device is separated from a host vehicle.

In embodiment, the device may additionally or instead of the aerodynamic surfaces, as discussed, include a parachute. The parachute may be triggered a certain time after separation, or a certain distance above the ground, and may allow for the device to more slowly settle down on the ground than if in freefall. Advantageously, this may reduce the chance of the device being buried in soft terrain, which may make the beaconing signals more easily observed and the device thus more likely to be found.

Cross-Device ("Mesh") Communication

It may be advantageous to provide facilities for multiple devices to communicate wirelessly with each other in a mesh topology. This may allow information from one device to be redundantly stored and recorded on another device, thus increasing the chance that at least one copy of the information is found and recovered. For example, where multiple aircraft in formation flight or on a common mission are each equipped with a device, the devices may communicate amongst each other to duplicate the information from the other devices. Advantageously, this communication may utilize the same radio transmitter and antenna functionality that may already be in place for the radio beaconing.

Adjustment of Device for Compatibility with Different Vehicles

It will be appreciated that, while the concept of a separable device may be applied to a variety of different host vehicles or for personal carrying, various considerations may need to be taken into account that are specific to the host vehicle in question. For example, the device may be configured with custom separation triggers for the vehicle on which it is carried. As discussed, for an aircraft, this may be unsafe proximity to terrain or, for example, an impeding midair collision. For a helicopter, there may be additional potential separation triggers, for example, a detected rotor stall of the main rotor, and detected contact between the rotor and a foreign object, for example, a wire, or a detected loss or separation of rotor components from the airframe. Conversely, some separation triggers may not be useful in the context of some vehicles. For helicopters, for example, due to a helicopter's typical ability to operate off-airport and land and take off from many different types of terrain, it may not be desirable to trigger separation based on a helicopter's perceived unsafe proximity to such terrain. Similarly, for a boat, the events triggering separation may include detected hull failure, a collision between the boat and another object, capsizing, or major water ingress. For a rail vehicle, such as a locomotive, derailment may be a potential separation trigger.

For a drone or other type of unmanned aerial vehicle [UAV], another separation trigger may be the failure of radio communications between the drone and its operator. For a land vehicle, such as a car, motorcycle, or tank, triggering separation may be based on a detected collision, fire, operator incapacitation, or structural failure of the vehicle.

Special considerations may apply where the device is designed to be worn directly by an operator, such as a hunter, mountaineer, diver, or other person engaged in activity, especially solitary activity, that may be associated with high risk of injury. Separation events may be based on operator vital signs, such as heartbeat, respiration rate, blood sugar, body temperature, etc.

Additionally, for both host vehicles and operators, certain environmental triggers may be used for separation, such as when poisonous chemicals, hazardous ionizing radiation, rapid deceleration indicating a shock, freefall indicating that the vehicle or operator is dropping from great height, and other potentially catastrophic events are detected.

Advantageously, a device may be configured to first provide a visible and/or audible alarm to an operator, indicating that separation is imminent unless cancelled by the operator. The device may then proceed to separation if the operator does not respond to the alarm. If the operator is, in fact, not in peril, he or she may cancel the separation process, for example by pushing a button on the device.

Mounting

Various embodiments of the device according to the present disclosure may allow for mounting of the device to different positions on a host vehicle. It may be advantageous to take into consideration the characteristics of the host vehicle, such as an aircraft, helicopter, land or water vehicle, when choosing an appropriate mounting spot. For aircraft, a mounting location may be chosen that minimizes disruption of aircraft functionality, minimizes the risk of the aircraft being struck by the device during or after separation, and allows for maximum survivability of the device in the event of a catastrophic event. Advantageously, the device may be placed in the non-pressurized section of the aircraft, for example, near the landing gear, or underneath a maintenance flap at the exterior of the aircraft. Advantageously, this may place the device far away from the engines so as to minimize damage to the device in case of the catastrophic engine failure, allows for separation of the device towards the rear of the airplane, thus minimizing the chance that the path of the separated device crosses that of the aircraft, and does not require modifying or puncturing the pressurized cabin, thus making installation easier and safer. Advantageously, mounting the device underneath an existing maintenance flap may make installation easier and minimize the necessity for regulatory improvement (e.g. procurement of supplemental type certificates for a host aircraft), for example because the installation if the device may not be directly exposed to outside airflow and thus its installation may not alter the aerodynamics of the aircraft.

For a person-portable device, the device may be carried in a backpack or otherwise be attached to the wearer, advantageously so that the wearer always remains clear of the device's trajectory after separation. For example, the device may be connected to one or more sensors attached to the wearer, for example using a wrist strap, sewn into a garment or piece of clothing worn by the operator (e.g. pant or shirt sleeve), or attached to a key chain or other piece of equipment (such as integrated into a helmet, parachute, wingsuit, jetpack) worn or carried by the operator The device may collect data from external sensors (e.g. wirelessly connected pulse or temperature sensor), from internal sensor (e.g. integrated GPS and accelerometer), or both. Advantageously, the use of external sensors allows the device to be carried in a different location from the sensors and thus may make carrying the device more comfortable.

FIGS. 1A and 1B illustrate an exemplary system 100 configured to launch and/or eject a device 105 (e.g., Telecommunication Emergency Device, "T.E.D.") from a vehicle before or during a predetermined threshold or event (e.g., a catastrophic event). In some cases, the device 105 may be ejected after the predetermined threshold (e.g., after a crash) to preserve data collected in the event of a fire of the vehicle by positioning the device 105 away from the vehicle if the device was not ejected before or during the predetermined threshold. Accordingly, there may be more than one predetermined threshold (e.g., two, three, or more) to activate ejection of the device 105 as discussed herein. For example, the first predetermined threshold may be altitude of the vehicle. In the event that the device 105 is not ejected at a certain altitude (e.g., because of mechanical failure), a second ejection of the device 105 may be attempted after the crash (e.g., detecting a high impact as a second threshold event).

The predetermined thresholds do not have to be detected in a specific order for the device 105 to be ejected. For example, if the first threshold event of a certain altitude is not detected (e.g. malfunction of a sensor), then the device 105 may be attempted to be ejected for the first time upon detection of the second predetermined threshold (e.g. a high-impact crash). As discussed herein, Kalman filtering may be used to provide reliable detection of separation events even in the event that one or more sensors fail or become unreliable.

The exemplary system 100 includes a holding area, housing, shell, or tube 110 configured to protect and/or hold the device 105 in place, a deployment mechanism or separation mechanism 115, a flange 120, one or more fasteners 125, and one or more stabilizers 135. The system 100 can be modified to be used with various existing vehicles, for example, aircraft, rail vehicles (e.g. locomotives), watercraft (ships), automobiles, etc. Such vehicles may be used for a variety of purposes, including military, commercial, personal use, etc. In one example, a system 100 may include a device 105 that can record in real time airplane (or other vehicle such helicopter, water vessel, ship, drone etc.) information (e.g., location of the airplane) similar to the information that is recorded by a black box of the airplane, as well as additional information as desired. Before or during a catastrophic event, the system 100 may be configured to separate the device 105 from the host vehicle (e.g. airplane) with the black box information including a locked-in GPS location of the airplane when the device 105 is ejected.

The device 105 may be configured to broadcast radio signals associated with the airplane information for rescue crews to find the device 105. Accordingly, the locked-in GPS location associated with separation ejection event from the vehicle, (e.g., plane) would be associated with close proximity to the actual crash site (e.g., after a predetermined threshold, the device 105 is ejected in the air, and the plane crashes into the ground a few miles away from the ejection site). Similarly, for watercraft, separation of a device, which may be buoyant, allows to locate a vessel which may have sunk.

In some embodiments, the device 105 may be in communication with another recording device in the vehicle. For example, a plane equipped with a flight data recorder or cockpit voice recorder ("black box") may also be equipped with the system 100, and the device 105 may communicate with the black box. In this way, the device 105 could be configured to receive any information stored at the black box. In some embodiments, the device 105 could independently record information (e.g., location information, time since takeoff, transmitted radio signals, sounds, etc.) as with a black box and/or in addition to the information recorded by the black box. Such communication may be performed wirelessly and/or via a wired connection. For example, the device 105 and the black box may be connected with wires having a quick release connection so as to allow the connection to easily be severed if/when the device 105 is ejected. Alternatively, the device 105 and the black box may communicate via various wireless technologies, e.g., Bluetooth, near-field communication (NFC), Wi-Fi, 3G, 4G, etc.

The device 105 may have a suitable body shape and integrity to puncture a vehicle wall, door, window, etc. upon ejection. For example, as shown in FIG. 1A, the device 105 may have a rounded end in contact with or adjacent to the vehicle body 130. The device 105 can have any other suitable shape and necessary integrity to puncture through the vehicle body upon deployment. For example, the rounded end may alternatively be pointed, have a truncated point, etc. The rounded end may be positioned directly between the deployment mechanism 115 and the vehicle body 130 to apply maximum power to the vehicle body 130. Before or during a catastrophic event, the deployment mechanism 115 may be activated, causing the device 105 to puncture and pass through a portion of the vehicle body 130. The exterior of the device 105 may be reinforced to maintain or substantially maintain its integrity during ejection. The device 105 may be of any suitable shape, such as for example, tubular shape to correspond to the shape of the holding area 110 as discussed herein. The vehicle body 130 may be any outer portion of a vehicle, including a wall, door, window, etc. The device 105 may be configured to puncture through any type of vehicle body 130 or may be configured for a particular type.

As illustrated in FIG. 1A, the device 105 can be contained in a holding area 110 (e.g., a tube, housing, enclosure, chute, container, chassis, shell, cage, etc.). The holding area 110 may be a portion of a vehicle and/or may be configured to be fastened to a vehicle and may be reinforced so as to protect the device 105 during a catastrophic event. That is, the holding area 110 may be sufficiently reinforced so that the device 105 may be ejected even if the vehicle has sustained structural damage. For example, the holding area 110 can be formed from a high impact plastic tube. The size of the plastic tube can be determined based on the vehicle. Various locations on the vehicle for the holding area can include near the cockpit, the lavatories, and/or tail of the plane.

The device 105 and its components, including body, can be made from any suitable high-impact resistant materials such as plastics (polymer materials) or metals. In some embodiments, the device 105 body and/or stabilizers include material of polypropylene. The holding area 110 and its components, including body, can be made from any suitable high-impact resistant materials such as plastics (polymer materials) or metals. In some embodiments, the device 105 (including stabilizers) and/or holding area 110 can be made from materials that include or are composed of polypropylene. The selected materials should have desired or predetermined physical characteristics and properties to resist, for example, fracture and deformation and to maintain structural integrity in case of catastrophic events or impacts as discussed herein.

The holding area 110 may attach to the vehicle body 130 at the flange 120 via the fasteners 125 (e.g., rivets). As shown in FIG. 1B, the flange 120 may comprise a portion of the holding area 110 that completely surrounds the device 105. Alternatively, the flange 120 may comprise one or more unconnected portions. The flange 120 may be an extension of the holding area 110 or may be a separate component. The fasteners 125 may be configured to maintain a connection between the flange 120 and the vehicle body 130 before and after ejection of the device 105. Other connection mechanisms of the holding area 110 with/to the vehicle body 130 can be used. In some embodiments, the holding area 110 can be attached or connected to the vehicle body 130 using any suitable or known process or processes, including permanent adhesive, thermal bonds, ultrasonic bonds, spot welds, e.g., thermal weld points, a stitch or stitches, strip welds, tacks formed by crimping, and/or press fit, shrink fit, sliding fit, interference fit, and/or snap fit mechanisms, including male and female parts, and the like, including any combination thereof.

Moreover, the holding area 110 may be configured to remain intact after ejection of the device 105. In some embodiments, the device 105 may be configured to create a discrete opening in the vehicle body 130 that may be contained within the holding area 110. In this way, following ejection of the device 105, only the interior of the holding area 110 may be exposed to the air, water, etc. that may seep through the opening of the vehicle body 130 created by the device 105.

Accordingly, any desired vehicle can be retrofitted with a holding area 110 and the device 105. The holding area 110 and the device 105 can be sized and shaped such that they can be positioned within an interior of the vehicle without necessarily needing modification of the vehicle. The holding area 110 can be attached to the vehicle body 130 without modification of the vehicle body 130. In some embodiments, the vehicle can be specifically designed to accommodate the holding area 110 and the device 105 as desired. As discussed herein, the holding area 110 can have structural integrity to maintain its shape and substantially relative position to the vehicle body 130 such that substantially regardless of the damage to the vehicle and/or vehicle body 130, the device 105 is protected and can be safely ejected from the vehicle.

The device 105 may be ejected by activating the deployment mechanism 115. The deployment mechanism 115 may be, for example, a coiled spring that is released by a clamp connected to an electric switch triggered by release control logic. Deployment mechanism 115 may also be provided by a gas generator that generates pressure to facilitate separation, or a pyrotechnic device, such as a rocket, attached to the device that propels it away from the vehicle.

However, the deployment mechanism 115 may also comprise compressed air, magnets, fuel, etc., that may be used for creating propulsion in the device 105. In an embodiment, deployment mechanism 115 may include a gravity release that, upon engagement, allows the device to drop out of a launch tube. Because of its simplicity, this may be an advantageous design for smaller aircraft, where the additional safety and weight considerations of carrying a more complex design, such as a pyrotechnic device, are significant, or may be used in the case of when more complex designs fail. Embodiments for surface vessels, such as ships and cars, may comprise a design featuring rockets or pyrotechnic separation; since these vehicles do not operate significantly above ground level, it may be advantageous to launch the device upwards away from the vehicle upon separation to allow the device's radio beacon to be received from greater distances beyond the horizon.

Where deployment mechanism 115 includes a gravity release, the device 105 may be attached to the aircraft using a wire release mechanism that can be triggered by an electric current from the device. Where deployment mechanism 115 includes a pyrotechnic device, a blasting cap or other electronic fusing mechanism may be provided to allow triggering of separation using an electric signal (e.g. current between two terminals) from the device. This signal may be controlled (for example through a relay switch) from the device's internal computer; advantageously, this allows the device to autonomously trigger release upon determining that a release trigger is met. In some embodiments, the deployment mechanism may be externally controlled such by an onboard vehicle computer by a person (e.g., manually).

To eject the device 105, the system 100 may be configured to receive signals indicative of a variety of information. For example, the system 100 may receive signals indicative of the altitude of the vehicle, particularly if the vehicle is an aircraft. If the altitude of the aircraft falls below a given threshold (e.g., 100 feet) and the aircraft is not in takeoff or landing mode, the deployment mechanism 115 may be activated. In another example, the signals may be indicative of dramatic changes in altitude. If altitude decreases at a rate beyond a given threshold, the deployment mechanism 115 may be activated. In another example, the signals may be indicative of objects detected by the vehicle's radar. If the radar detects another object in close proximity and/or in the path of the vehicle, the deployment mechanism 115 may be activated. In another example, if the radar detects another object approaching the vehicle on a trajectory that makes a collision likely, the deployment mechanism 115 may be activated.

A vehicle or operator may also carry multiple devices 105 which may synchronize data with each other and/or a black box or other recording device. The multiple devices 105 may be situated at different locations throughout the vehicle to improve the likelihood that at least one of the devices 105 is successfully deployed, e.g. in the event that a portion of the vehicle is badly damaged.

In other embodiment, a device 105 may be configured to be carried and/or attached to a person or object. In such embodiments, the device 105 may receive information from another recorder (e.g., a black box) and may also independently record information. For example, a sailor on a boat may carry a device 105 on a boat. While the sailor is on the boat (e.g., near the other recorder) the device 105 may receive information from the other recorder. If the sailor is separated from the boat, the device 105 may independently record information that may be useful in locating the sailor and/or the boat. For example, the device 105 may record time in water, location, the sailor's heartbeat and/or other physical conditions, etc. and broadcast the information in signals.

As discussed herein, the device 105 can independently record information associated with, for example, the person carrying the device 105. For example, the device 105 may record the location when the device 105 loses communication with the other recorder associated with a vehicle. The device 105 can lock in the GPS location when the communication link was lost to indicate where the sailor, for example, went overboard. The device 105 can record and indicate location of the person independent of the vehicle. The device 105 can also record movement and/or position of the person while in/on the vehicle and/or off the vehicle. In the case of the example for sailor, the device 105 can record the time in water of the sailor.

The device 105 can also track and record physiological data associated with the person carrying or having the device 105 (e.g., device positioned on the person to record physiological conditions). The physiological data that can be tracked and recorded may include heartbeat, body temperature, respiration rate, etc. The device 105 can be in wireless or wired communication with other sensors placed on the body of the person. For example, sensors that detect the physiological characteristics as discussed herein can be placed on a finger, wrist, arm, chest, etc. The physiological sensors and/or other sensors can be built into the device 105. Accordingly, the device 105 that is designed, sized, and shaped to be carried on a person can be applied to any desired field, for example, pilots, soldiers, hikers, etc. Upon a pre-determined threshold and/or catastrophic event, which can be associated with the person, the device 105, in some embodiments, can be ejected away from the person 105. Example implementations include a device fashioned as a keychain, to be strapped to an operator's arm or leg, or attached to a backpack, pouch or other carrying means, or connected to a piece of equipment, such as a drysuit, parachute, or wingsuit attached to the operator. Such devices may not necessarily include a separation mechanism, but may be configured to endure adverse environmental conditions and automatically activate their beaconing mechanism. Advantageously, because data from various sensors may be included in the data sent out through the beaconing mechanism, the type and severity of an emergency can be detected by a receiver of the beaconing transmission.

FIG. 1C illustrates example locations of the device 105 in an example airliner. As illustrated on the body of the airplane in FIG. 1C, the device 105 can be positioned at any one of location(s) A, B, C, and/or D. For example, locations A and B are near or proximate the cockpit. Location C can be near or proximate to the lavatory. Location D can be near or proximate to the tail. There may be more than one device 105 positioned throughout the vehicle and other locations from locations illustrated in FIG. 1C. The location and/or number of locations can vary depending on type and/or size of the vehicle. Accordingly, in some embodiments with at least two devices 105 positioned in the vehicle that are in sync, built-in redundancy can help system integrity and value. For example, if only one device 105 deploys in an emergency situation or only one device 105 is recovered during search and rescue. Advantageously, the device 105 may be placed in the non-pressurized section of the aircraft to prevent any compromise of vehicle safety associated with puncturing the pressurized cabin. The device may be placed directly underneath an external surface of the aircraft, such as a maintenance flap, that can be moved out of the way by the separation mechanism when the device separates. Advantageously, this allows the device to not influence the aerodynamics of the vehicle. Depending on the aircraft, suitable mounting spots may include behind the ram air turbine door, behind the waste water ground service panel door, etc. Location behind the ram air turbine door may be particularly advantageous as a ram air turbine is typically designed to be only operated during an emergency and thus allows for the device to be adequately protected in non-emergency situations.

Figure 2:
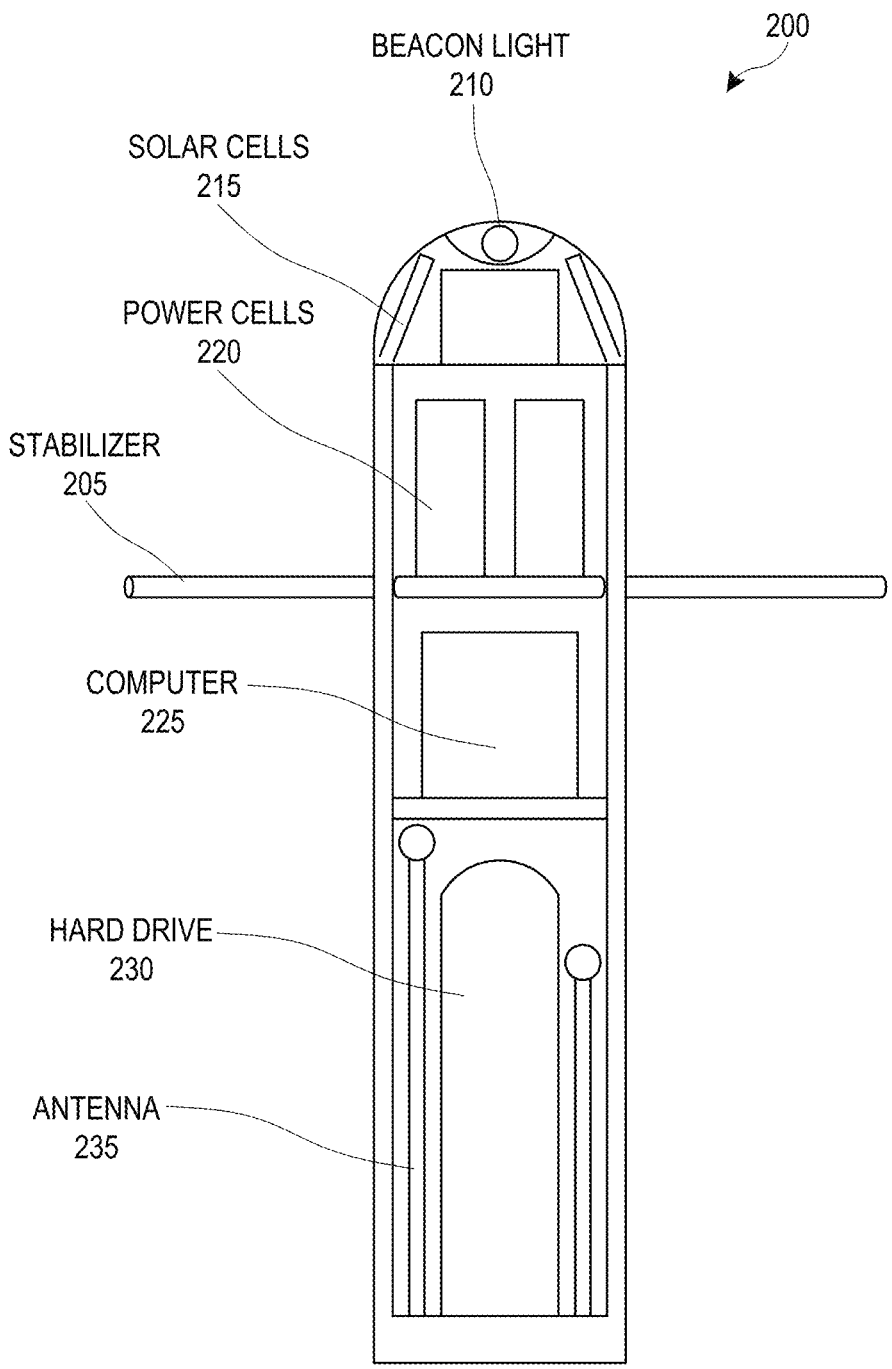
FIG. 2 illustrates an internal view of an exemplary device, according to some embodiments.

FIG. 2 illustrates an internal view of an exemplary device 200, for example, after ejection from a vehicle. Upon ejection from the holding area, stabilizers 205 (e.g., wings) may expand from the body of the device 200 to allow for a controlled descent of the device 200 through the air. Further, if the device lands in a body of water, the stabilizers can act as fins to help keep the device afloat (e.g., in the orientation shown in FIG. 2). In one embodiment, the stabilizers 205 may be located approximately two thirds of the length of the device 200 from the bottom. Weight distribution of the device 200 can be such that the device 200 remains upright in the body of water in the orientation shown in FIG. 2. Accordingly, the device 200 may be bottom heavy. However, the stabilizers and/or other components of the device 200 may be situated such that the device 200 remains in a different orientation in a body of water. The device 200 can have sufficient structural integrity to remain functional after impact with water, land, and other surfaces.

The exemplary device 200 further comprises a beacon light 210. The beacon light(s) 210 may be configured to activate after ejection of the device, after a substantially forceful impact, upon contact of the device 200 with water, etc. The beacon light 210 may be configured to generate a continuous or flashing light to make the device 200 more visible. The body of the device 200 can also be reflective or have reflectors attached (e.g., embedded in the body). The reflectors can further facilitate and/or supplement locating the device 200. For example, if the device 200 runs out of battery power for the beacon light 210, the reflectors may provide visual indication of the location of the device 200. The device 200 may have other beaconing mechanisms, such as an underwater locator beacon emitting acoustic signals, or other types of signaling devices, including signaling devices not dependent on electrical power. For example, device 200 may include a pyrotechnic smoke emitter that is triggered upon separation, or may include a marine dye marker, released upon contact with water, for improved visibility in water.

The device 200 may further comprise solar cells (e.g., four cells) 215 to charge power cells 220 of the device 200. The beacon light 210 and/or solar cells 215 can be contained in a translucent portion of the device 200 to allow for the light of the beacon to leave as well as the solar cells to receive solar energy. The power cells 220 may comprise lithium batteries that are charged by the (four) solar cells. The power cells 220 may be connected to any component of the device 200 through a power interface to power the components, such as for example, the beacon light 210 and/or antennas 235. In one example, the device 200 can remain powered for at least 18 months upon ejection. The device 200 may also have one or more reflective surfaces on an outer portion of the device 200. For example, the device 200 may have three reflective bands wrapped around and/or affixed to the device 200. In this way, the device 200 may have increased visibility in the event that the power cells 220 run out or fail.

It is noted that the positioning of the various components illustrated in FIG. 2 as well as other figures is exemplary and does not preclude other variations. For example, the beacon light 210, solar cells 215, and/or translucent portion may be situated on either end of the device 200 or on a side portion of the device 200 to protect the components from damage during ejection.

The exemplary device 200 further comprises a computer system 225 including a hard drive 230 and/or digital recorder to store data from the vehicle. Further, the device 200 comprises one or more antennas 235. The one or more antennas may comprise a high-frequency antenna and/or a low-frequency antenna. For example, the low-frequency antenna may be a long-range antenna for broadcasting signals and the high-frequency antenna may be a short-range antenna for broadcasting signals. The broadcasted signals may provide information about the vehicle to assist in locating the vehicle and/or the device 200. For example, if the device 200 was ejected from an airplane, the one or more antennas 235 may broadcast the tail number of the airplane. The antennas 235 may be situated so as to provide optimal or near-optimal reception. For example, if the device 200 is weighted such that it remains in the orientation as shown in FIG. 2 in a body of water, the antennas 235 may be situated near the beacon light 210 (e.g., near the top of the device 200 in the illustrated orientation of FIG. 2). The antennas 235 may alternatively be situated near the hard drive 230.

FIGS. 3A-3C illustrate exemplary stabilizers for a device. As shown in FIG. 3A, a stabilizer 305 may be mounted to the body 310 of the device 300 via hinges 315 (e.g., spring loaded hinges).

As shown in FIGS. 3B and 3C, the stabilizers 305 can be housed in an indentation, cutout, recess 320 of the body of the device 310. The stabilizer 305 can be substantially flush with the body of the device 310 to facilitate ejection of the device 310 from the holding area. The stabilizers (e.g., wings, fins, ailerons) may be in a folded configuration when in the holding area. Various configurations of stabilizers may be used; passive (i.e. uncontrolled) aerodynamic surfaces may be used, and may be rigidly attached to or shaped integrally with the housing structure. Alternatively, moveable mechanisms, such as "rolleron" type stabilizers may be used, wherein a wheel with fins or protrusions protrudes into the airflow, thus spinning up during descent and providing a gyroscopic force that resists rotation.

Upon deployment and the stabilizers 305 moving into the open/deployed position as shown in FIG. 3C, a locking mechanism 325 can deploy from either the stabilizer 305 or the body of the device 310 to lock the stabilizer 305 relative to the body 310 (e.g., inhibit the stabilizer 305 from retracting back against to the body of the device 310). The locking mechanism 325 can also be spring activated.

Figure 4:
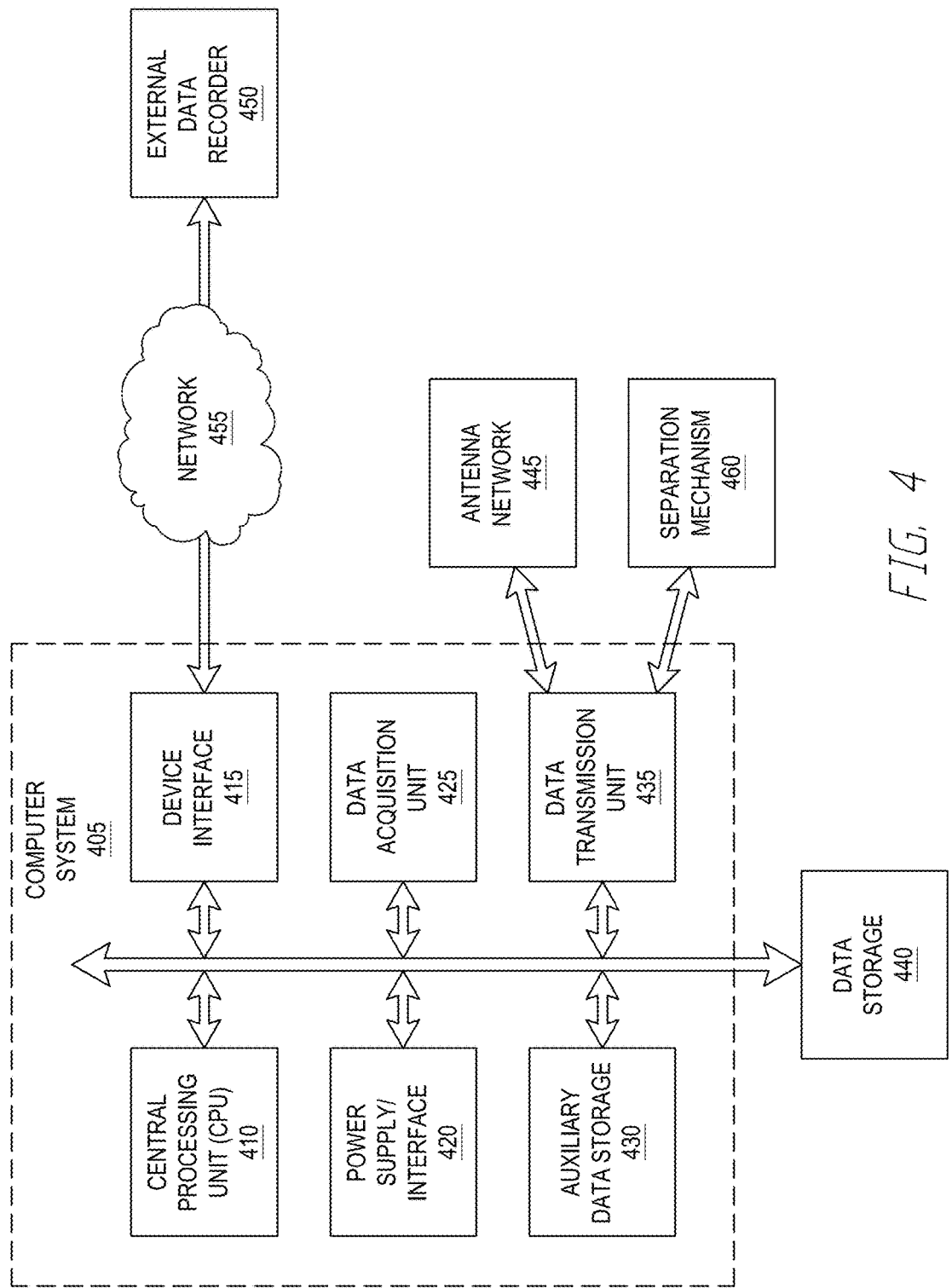
FIG. 4 is block diagram of an exemplary system for acquiring and/or transmitting data by a device, according to some embodiments.

FIG. 4 is an illustration of exemplary system for acquiring and/or transmitting data by a device. One or more components illustrated in FIG. 4 may be contained within one of the devices described in the embodiments discussed herein. Other components may be external to such devices. For example, a device may include a computer system 405 comprising a Central Processing Unit (CPU) 410, an interface 415, a power supply or power interface 420, a data acquisition unit 425, an auxiliary (e.g., temporary) data storage 430, and a data transmission unit 435. The computer system 405 may communicate bi-directionally with a data storage 440 (e.g., hard drive) and an antenna network 445, each of which may be contained in the device or external to the device. The computer system 405 may also communicate bi-directionally with an external data recorder 450 (e.g., a black box, microphone, GPS device, etc.) via the interface 415 or other component.

The interface 415 may communicate with one or more external data recorders 450 via a wired and/or wireless connection. A wired connection may be configured to be releasable in the event of an ejection of a device without damaging the device and the information received from the external data recorder 450. In some embodiments, the interface 415 and external data recorders 450 may communicate via a wireless network 455 while in a close proximity.

The power supply and/or power interface 420 may include a battery or other storage device configured to store power. The battery may provide power via a poer interface to components or features of the device as discussed herein. In some embodiments, the power supply 420 may be contained in a device as described in the embodiments discussed herein, and receive power from a source external to the device via a power interface. For example, while a device is in a holding area within a vehicle, the power supply 420 may receive power via a wired or wireless connection from an external power source, such as power generated by systems of a vehicle. The power supply or power interface 420 may also receive power from a source within the device. For example, the power supply 420 may receive power via a power interface from solar cells contained within the device after the device has been ejected from a vehicle.

The data acquisition unit 425 may be configured to acquire various data. For example, the data acquisition unit 425 may determine location information for the device and/or vehicle carrying the device. The data acquisition unit 425 may also be configured to record noises, track time, record physiological information about a person carrying the device (e.g., heart beat), etc. The acquired data may also be information (e.g., signals) provided by instrumentation of the vehicle. For example, if the vehicle has a radar, the data acquisition unit 425 may receive signals from the radar to determine whether there are objects in the proximity of the vehicle which may cause damage to the vehicle.

The auxiliary data storage 430 may be configured to store data received from other components, for example the interface 415, data acquisition unit 425, CPU 410, and data storage 440. For example, data received by the interface 415 or data acquisition unit 425 may be stored at the auxiliary data storage 430, and the CPU 410 may determine which information stored in the auxiliary data storage 430 is transmitted to the data storage 440.

The data transmission unit 435 may provide data to the antenna network 445 for transmitting signals carrying the data. For example, the tail number of a plane carrying a device may be stored and, following ejection of the device, the data transmission unit 435 may transmit the tail number to the antenna network 445 and the wireless network 455 may generate one or more signals conveying the tail number.

When a separation trigger is met, central processing unit 410 can energize separation mechanism or deployment mechanism 460 (e.g. a relay switch), thus engaging the separation mechanism as discussed.

It will be appreciated that not all components need necessarily be carried with the separable device. For example, in some embodiments, the CPU 410, separation mechanism 460, and data acquisition unit 425 may be onboard with the separable device, whereas in other embodiments, one or more of these components may be separate from the device and thus not be ejected altogether.

Figure 5:
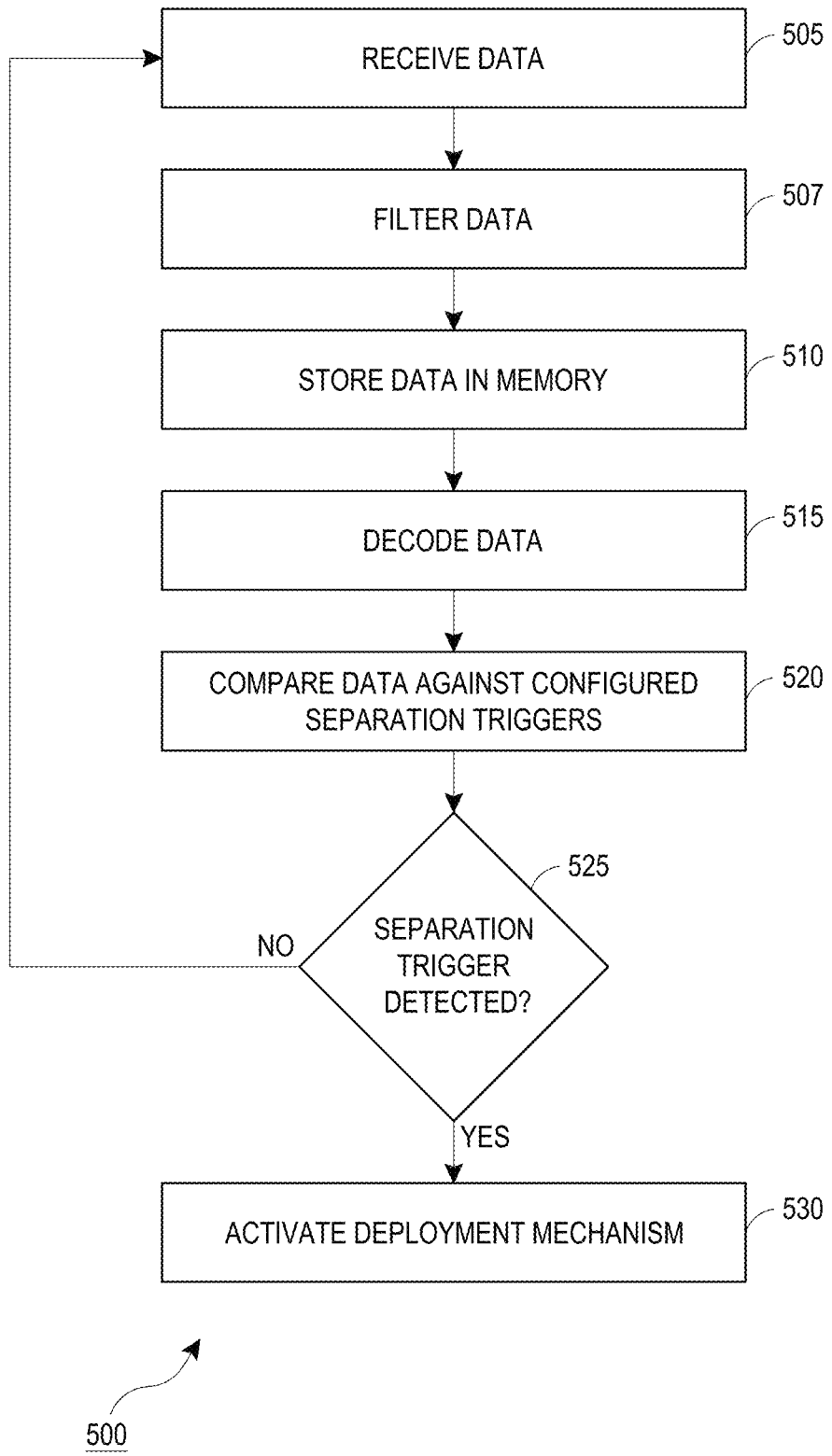
FIG. 5 is an illustration of an exemplary process which may be performed by systems and/or devices described in this disclosure, according to some embodiments.

FIG. 5 is an illustration of an exemplary process which may be performed by systems and/or devices described in this disclosure. At block 505, the process 500 may involve receiving data by a device as discussed herein. The data may be received from an external device or may be determined by the device itself. In one embodiment, the data may relate to a vehicle carrying the device (e.g., an operating parameter of the vehicle). For example, the device may receive location, altitude, temperature, radar, speed, velocity, acceleration and/or other information about a vehicle carrying the device.

At block 505, input data (e.g. a data frame from a data bus of the host vehicle, or a measurement device attached to an operator, or sensors on the device itself) may be received. For example, a position report may be received from a GPS device, or a terrain proximity warning may be received from a terrain collision avoidance system of an aircraft.

At block 510, the data frame may be recorded to the memory, such as flash memory. As discussed herein, this may involve compressing and/or encrypting the data before storing it to the flash medium. If, during block 510, the end of the recordable area of the memory is reached, the recording may "wrap around" and start again overwriting the beginning of the recordable medium, thus helping ensure that the latest data frames are preserved.

At block 515, the data is decoded. This may involve parsing out various information. For example, the device may convert the information into a format suitable for comparing against the stored separation triggers. The data may be validated against a checksum to ensure integrity of the received data, and the information for which separation triggers are configured may be extracted from the data. At block 525, the process 500 may involve determining whether a predetermined event or threshold (e.g., catastrophic event) is detected as discussed herein. The determination may be based on the received data. For example, a vehicle carrying a device may have a thermometer which transmits signals related to the temperature inside the vehicle, and the device may receive the signals. If the temperature information received by the device exceeds a threshold, the device may determine that a catastrophic event (e.g., fire, explosion, etc.) has occurred or will occur. If a catastrophic event is not detected, the process 500 may return to block 505 to process the next data frame sent from the bus. If a catastrophic event is detected, the process 500 may continue to block 530.

In an embodiment, an optional, intermediate filtering step 507 may be performed between steps 505 and 510, filtering out data frames that need not be stored. For example, the temporal resolution of some readings may be reduced to reduce the amount of data that will be recorded, or only data from certain sensors but not others may be recorded. Advantageously, this may reduce the amount of data written to the flash medium and thus increase the useful life of the flash medium; additionally, longer time periods can be recorded without overwriting. This filtering, however, may include parsing the bus frame before recording and thus may be excluded in some embodiments.

At block 530, the process 500 may involve ejecting the device with a deployment or separation mechanism such as energizing a separation relay to separate or eject the device as discussed herein.

Figure 6A:
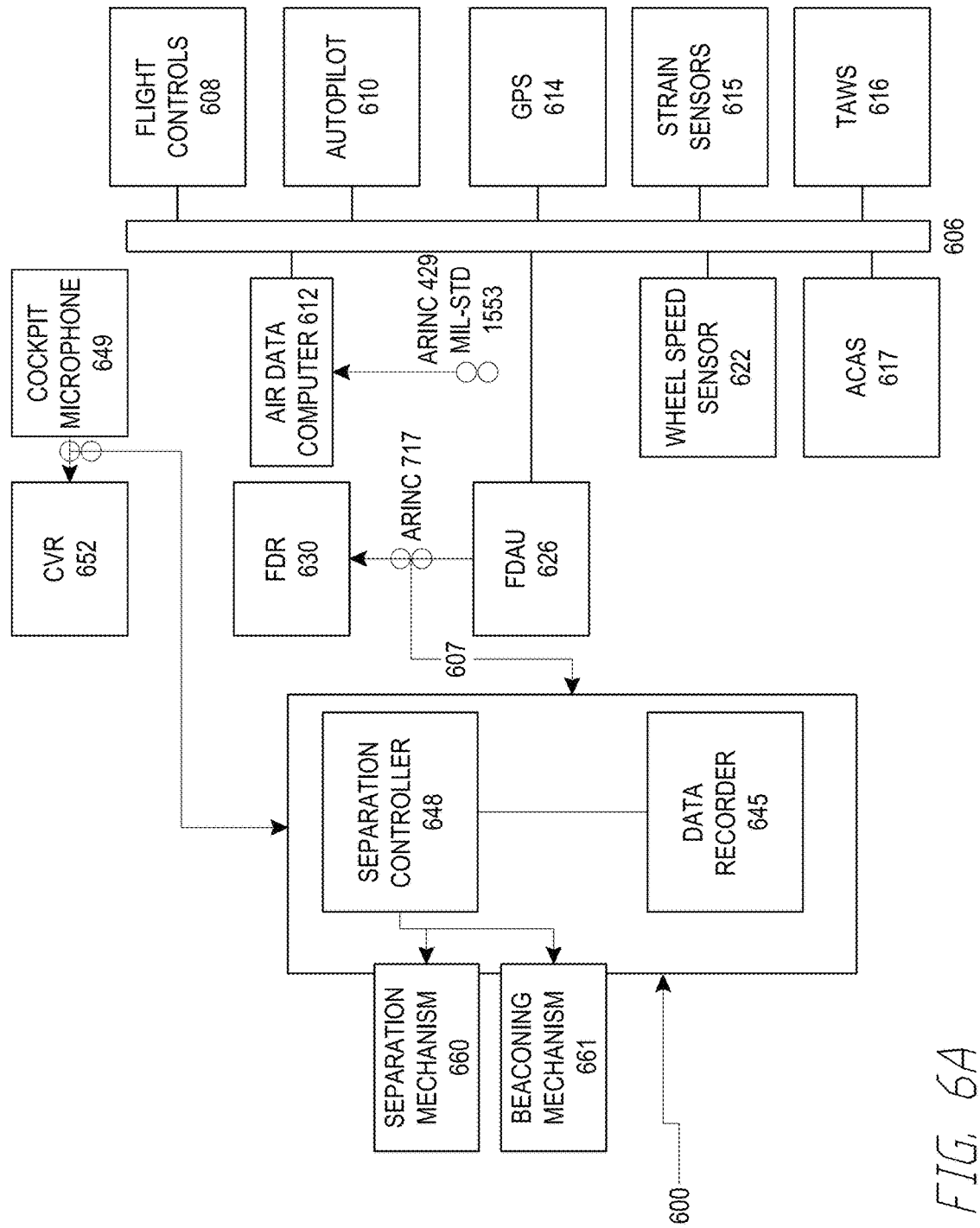
FIG. 6A is a block diagram of an exemplary device connected to an aircraft, according to some embodiments.

FIG. 6A is a block diagram of a separable device 600 connected to an aircraft, according to an embodiment. FIG. 6A illustrates a flowchart separable device 600 connected to an aircraft. Many modern aircraft communicate internally between various systems and sensors using one or more avionics data busses, such as avionics data bus 606. Avionics data bus 606 may be a standard avionics bus, such as an ARINC-429 bus or a MIL-STD1553 bus. Various systems and sensors may be connected to avionics data bus 606, including sensors for flight controls, one or more autopilots 610, a GPS receiver 614, structural load and strain sensors 615, wheel speed sensors 622, and many more different other sensors and systems. To provide for recording of flight data in the event of an accident, a flight data acquisition unit is typically connected to the avionics data bus 606. Flight data acquisition unit 626 captures data from avionics bus 606 and converts it into a format suitable for recording by a flight data recorder 630. Flight data acquisition unit 626 and flight data recorder 630 can be connected using a digital bus system, such as an ARINC-717 bus 607 To capture, and record, the data provided to flight data recorder 630, device 600 may be connected to bus 607, thus accessing the same data stream as flight data recorder 630.

Advantageously, the device 600 may be integrated into an existing installation of an aircraft, without making significant changes to the existing flight data recorder, flight data acquisition unit, or other circuitry. Advantageously, device 600 may be connected to data bus 606 using, for example, inductive coupling connectors. Advantageously, this allows device 600 to be integrated into an existing circuit between a flight data acquisition unit 626 and a flight data recorder 630 without splicing wires or otherwise compromising the integrity of the existing circuit. Additionally, device 600 may also be connected to a cockpit microphone 649. Cockpit microphone 649 may be a microphone located in or near the aircraft cockpit that captures words spoken by the pilot, and other sounds audible in the cockpit. Cockpit microphone 649 may be connected to a cockpit voice recorder (CVR) 652.

The device 600 can include a separation controller 648 and a data recorder 645. The separation controller 648 can be part of the CPU 410 as discussed herein. In some embodiments, the separation controller 648 is separate from the CPU 410. The data from the cockpit microphone 649 and the flight data acquisition unit 626 are being fed into, and recorded by, data recorder 645. For example, data recorder 645 may record all bus frames received over bus 645, and may sample, compress, and record the analog audio signal received from cockpit microphone 649. Separation controller 648 continuously analyzes the data received from flight data acquisition unit 626 for the presence of one or more separation triggers. For example, separation controller 648 may analyze information from airborne collision avoidance system 617, to determine an imminent midair collision, analyze information from terrain awareness and warning system 616 to determine an imminent collision with terrain, analyze information from strain sensors 615 to determine an imminent structural failure of the aircraft, analyze the information from air data computer 612 and flight controls 608 to determine an imminent or presently occurring irrecoverable condition, such as a high speed stall, and other parameters. When separation controller 648 determines that a separation trigger has been met, separation controller 648 proceeds to fire or activate separation mechanism 660, for example by energizing a separation relay to separate device 600 from the aircraft. Separation mechanism 660 may be a pyrotechnic device, such as a pyrotechnic gas generator, that generates gas pressurizing a launch tube in which device 600 is housed, thereby opening the end of the launch tube and ejecting device 600 out of the aircraft as discussed with reference to FIGS. 10A-10B. For example, separation mechanism 652 may be ignited by separation controller 648 through the use of an electric blasting cap. Separation mechanism 652 may be any other deployment mechanism discussed herein. Separation controller 648 may also be connected to a beaconing mechanism 661, such as a radio beacon, a strobe light, or other mechanism discussed herein, advantageously triggering broadcast of the beacon signal upon, or shortly after, separation.

FIGS. 6B, 6C, and 6D illustrate various views of a device 600 as may be carried on an aircraft. FIG. 6B illustrates a front view of the device 600. FIG. 6C illustrates a side view of the device 600. The device 600 can be enclosed in a shell, body, or housing 680, which provides impact resistance and isolation from water, heat, and other environmental factors. The shell 680 can a greater impact strength relative to impact strength of the body 130 of the vehicle. Shell 680 may be manufactured, for example, cast, out of steel, polymer, or another material provide adequate mechanical resistance, toughness, hardness, etc.

The shell 680 may, on the inside, be cladded with insulation material 684 Insulation material 684 provides thermal insulation between the inside of the device 600 and the outside. Insulation material 684 may, advantageously, also provide additional mechanical impact resistance. Advantageously, ceramic materials, such as ceramic fiber pads, asbestos, fiberglass, graphite laminate, or similar materials may be chosen.

On the outside, shell 680 may feature one or more stabilizers 681 which may be formed integrally with shell 680 or may be externally attached (e.g. glued, welded) to the surface of shell 680. Stabilizers 681 may be shaped to increase aerodynamic drag (e.g. by causing device 600 to spin around its major axis, or by causing turbulent airflow around stabilizers 681, or both).

The shell 680 can house circuit board 686 and power storage 688. Advantageously, the empty space between circuit board 686 and power storage 688, and the surrounding shell and insulation materials, can be filled up with potting compound to provide additional shock resistance and avoid the electric components being damaged upon the device experiencing a hard impact.

The circuit board 686 comprises various electronic components implementing the logical functionality discussed previously; for example, circuit board 686 may comprise a microcontroller, such as an Atmel microcontroller, comprising a CPU, memory, and non-volatile storage. The microcontroller may be connected to a solid-state or electromagnetic relay switch to trigger the separation mechanism through general-purpose outputs of the microcontroller. The microcontroller may also be connected to one or more flash memory chips with an associated controller for data storage. Circuit board 686 may also comprise a power conditioning module connected to both the vehicle onboard power supply and a power storage 688. The power storage 688 may be a battery, such as a lead-acid battery, or a capacitor. The power conditioning module may keep power storage 688 charged, for example by float charging, and, upon failure of the external power supply, provide a stable supply voltage to the other components. The circuit board 686 may further comprise a radio module that drives the radio beaconing functionality.

The top of device 600 can be a transparent cap 690, which may be fabricated out of a high-impact material such as propylene. The cap 690 can house an antenna module 692 and an illumination beacon 694. The antenna module 692 may comprise one or more antennas; advantageously, patch antennas may be used for their small form factor. The antenna module 692 may be connected to a radio module on the circuit board 686 through an antenna feed line inside internal connector cable 691.

The bottom of device 600 may comprise an external connector 685 between circuit board 686 and an exterior of device 600, such as a launch tube. External connector 685 may provide both data and power to circuit board 600. External connector 685 be specifically designed to be disengaged from its receptacle; for example, as illustrated, external connector 685 may be designed so that the force exerted by connector 685 on device 600 normal to the expected direction of separation of device 600 is minimized. For example, connector 685 may utilize flat contact surfaces and magnetic retention. In some embodiments, external connector 685 may be similar to a land grid array (LGA) connector used in integrated circuit design. Alternatively, connector 685 may comprise various pins mating with an external connector. Connector 685 may be an inductive coupler, which may allow to transmit power and data across an air gap and thus reduce or entirely eliminate contact between connector 685 and an exterior of device 600, such as a launch tube. Other embodiments may not comprise connector 685 and utilize wireless power and data transmission using radio, e.g. by receiving data from an external transmitter through antenna module 692.

In other embodiments, electrical power, and data may be provided from the host vehicle to device 600 through a cable comprising wires inserted through the shell 680 and insulation 684 through an orifice. To ensure that the orifice does not compromise the device's resistance to heat and other environmental factors, it may be sealed with a resilient gasket, e.g. a gasket out of a similar material as insulation material 684, and provides a moisture, temperature, and impact-resistant barrier between the inside of shell 680 and the outside.

The illumination beacon 694 can include light-emitting diode (LED) strips. The light strips comprising beacon 694 may be activated upon separation, and may be pulsed periodically (e.g., in a predetermined pattern) so as to create the appearance of a rotating beacon light similar to a lighthouse. Advantageously, this allows an observer who knows the beacon frequency or predetermined pattern to locate and/or determine how far device 600 is away from the observer.

The internal connector cable 691 can connect the electronics housed in cap 690 with the circuit board 686; the connector cable 691 may comprise one or more antenna feed lines connecting circuit board 686 with antenna module 692, and a power cable connecting circuit board 686 with illumination beacon 694.

External connector 685 may comprise external contact surfaces, and corresponding internal wire leadouts, for both power and data connectivity. For example, internal connector 685 may lead out a power wire, a ground wire, a cockpit voice recording wire, a flight data recorder positive input wire, and a flight data recorder negative input wire. The power wire may be directly connected to the host aircraft's internal power distribution system. The ground wire may be connected to the host aircraft's common electrical ground. The cockpit voice recorder wire may be connected to a microphone recording cockpit sounds, such as the microphone feeding a conventional cockpit voice recorder. Advantageously, existing cockpit voice recorder microphones are providing a preamplified signal, so that adding device 600 into the circuit may not require additional signal amplification. One or more digital data wires may be connected to the output port of a flight data acquisition unit, such as the flight data acquisition unit feeding a conventional flight data recorder. In an example embodiment, a pair of wires may connect to a digital bus system, such as an ARINC-717 bus, which may be the same bus system feeding the existing flight data recorder. Advantageously, this may allow device 600 to be added to an existing flight data acquisition unit, thus duplicating the data being recorded by the flight data recorder, without making significant changes to the existing circuit.

In an embodiment, antenna module 692 may comprise a phased array, or several individual antennas or radiating elements that are driven out of phase with respect to each other. Advantageously, this may allow the directionality of the beam to be adjusted along one or two axes without moving antenna module 692. Antenna module 692 may be one implementation of beaconing mechanism 661.

Figure 7:
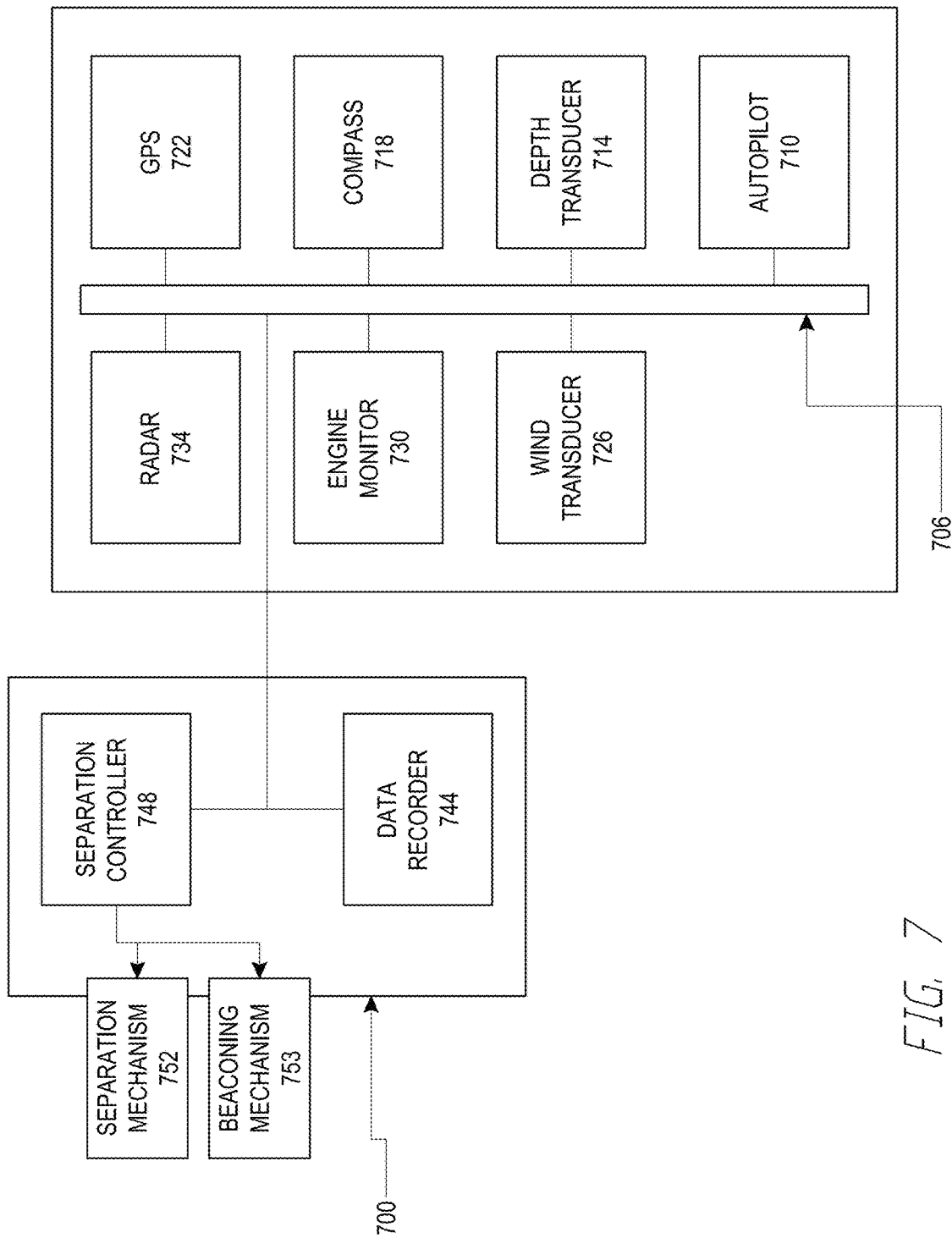
FIG. 7 is a block diagram of an exemplary device connected to a marine vessel, according to some embodiments.

FIG. 7 is a block diagram of a device 700 connected to a marine vessel, according to an embodiment. The marine vessel can be s ship, such as a container ship. Marine vessel data bus 706 provides data between various sensors and systems of the marine vessel. Data bus 706 may, for example, be an NMEA [National Marine Electronics Association]-2000-bus. Data bus 706 connects various systems, such as an autopilot 710, a depth transducer 714, a compass 718, a GPS receiver 722, a wind transducer 726, an engine monitor 730, and/or a radar unit 734. The device 700 can be connected to data bus 706 and thus receive data from the systems connected to the bus, such as the systems mentioned.

The device 700 can include a data recorder that records the data from data bus 706. Advantageously, data recorder 744 (e.g., memory or storage medium such as flash memory or any other suitable data storage device), may record all data (e.g. all bus frames) received, thus avoiding the need for interpretation and selection of data before recording and thus advantageously allowing for compatibility with a wide range of potential data sources. Alternatively, data recorder 744 may be configured to only record certain types of data, such a bus frames from specific devices, for example only the GPS 722, the autopilot 710, and the engine monitor 730. The device 700 can also include a separation controller 748, which receives data from the data bus 706 to determine whether separation should be triggered. For example, separation controller 748 may monitor radar 734 for an impeding collision with another vessel, or may monitor engine monitor 730 to detect a flooding of the engine room, may monitor depth transducer 714 for a beaching of the vessel, etc. The separation controller 748 can be part of the CPU 410 as discussed herein. In some embodiments, the separation controller 748 is separate from the CPU 410. When separation controller 748 detects an event that warrants separation, separation controller 748 triggers separation.

It may not be necessary for separation controller 748 or for data recorder 744 to transmit any data to data bus 706; as such, it may be advantageous to provide the connection to data bus 706 contactless, such as by an inductive reader circuit. Advantageously, this may allow for installation of device 700 without splicing any wires of data bus 706, and thus allow for easier and safer installation.

Separation controller 748 may be connected to a separation mechanism 752 to effect separation. Separation mechanism 752 may, for example, be a solid fuel rocket ignited by a blasting cap, where the blasting cap is electrically detonated and connected to separation controller 748. Separation controller 748 may then, upon determining that a separation trigger is met, cause separation by sending an electric current through the blasting cap, thus launching separation mechanism 752 and therefore cause separation of the device 700 from the vessel. Separation mechanism 752 may be any other deployment mechanism discussed herein, including a spring release mechanism or a gravity release mechanism. Separation controller 748 may also activate beaconing mechanism 753 (e.g. a light, a radio beacon, a smoke generator, a pyrotechnic device). Advantageously, beaconing mechanism 753 may be a marine dye marker, which, upon immersion, releases dye into the surrounding water, thus facilitating location and recovery of device 700.

Figure 8A:
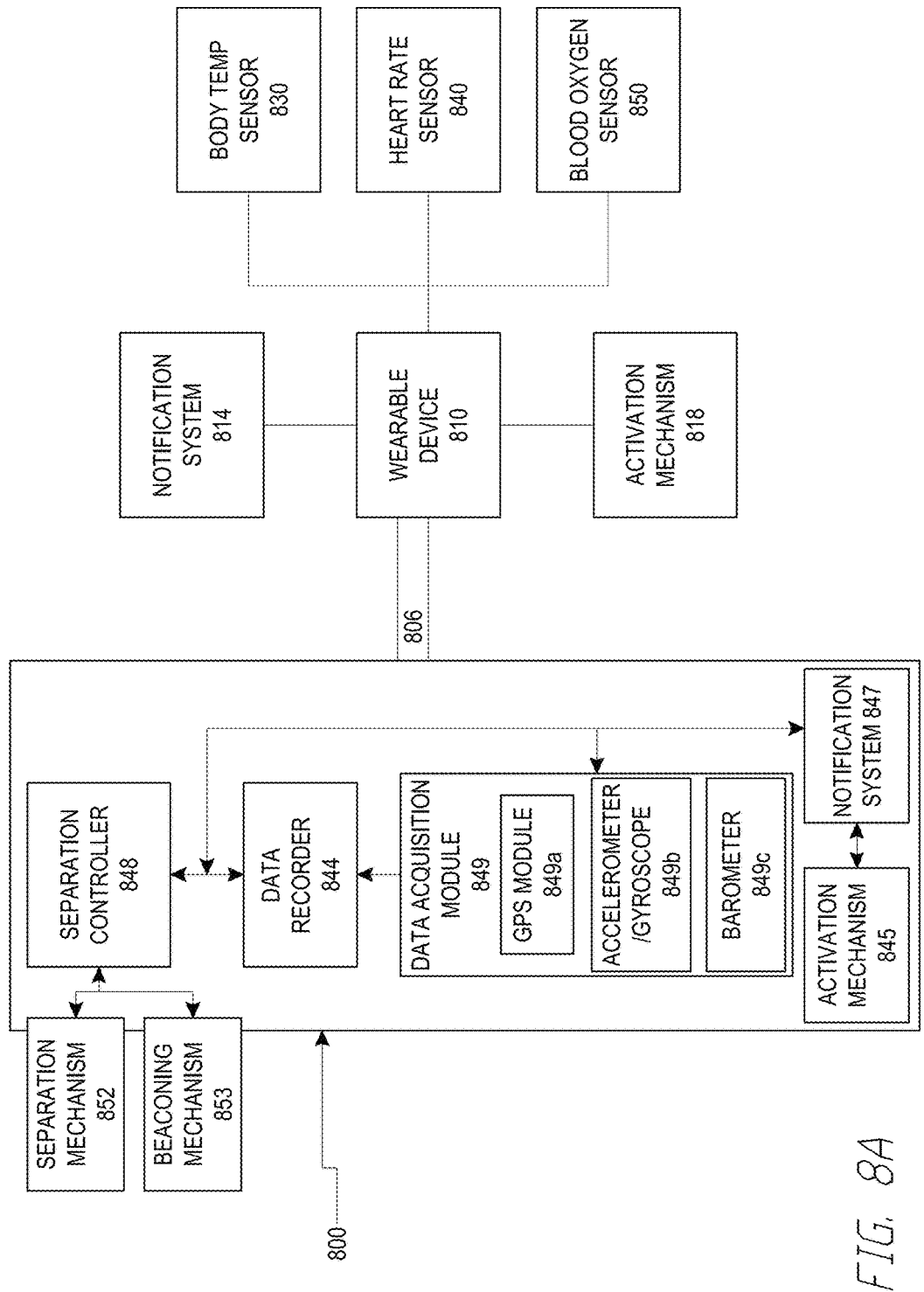
FIG. 8A is a block diagram of an exemplary emergency system comprising a person-portable separable device and a wearable sensor unit, according to some embodiments.
Figure 8B:
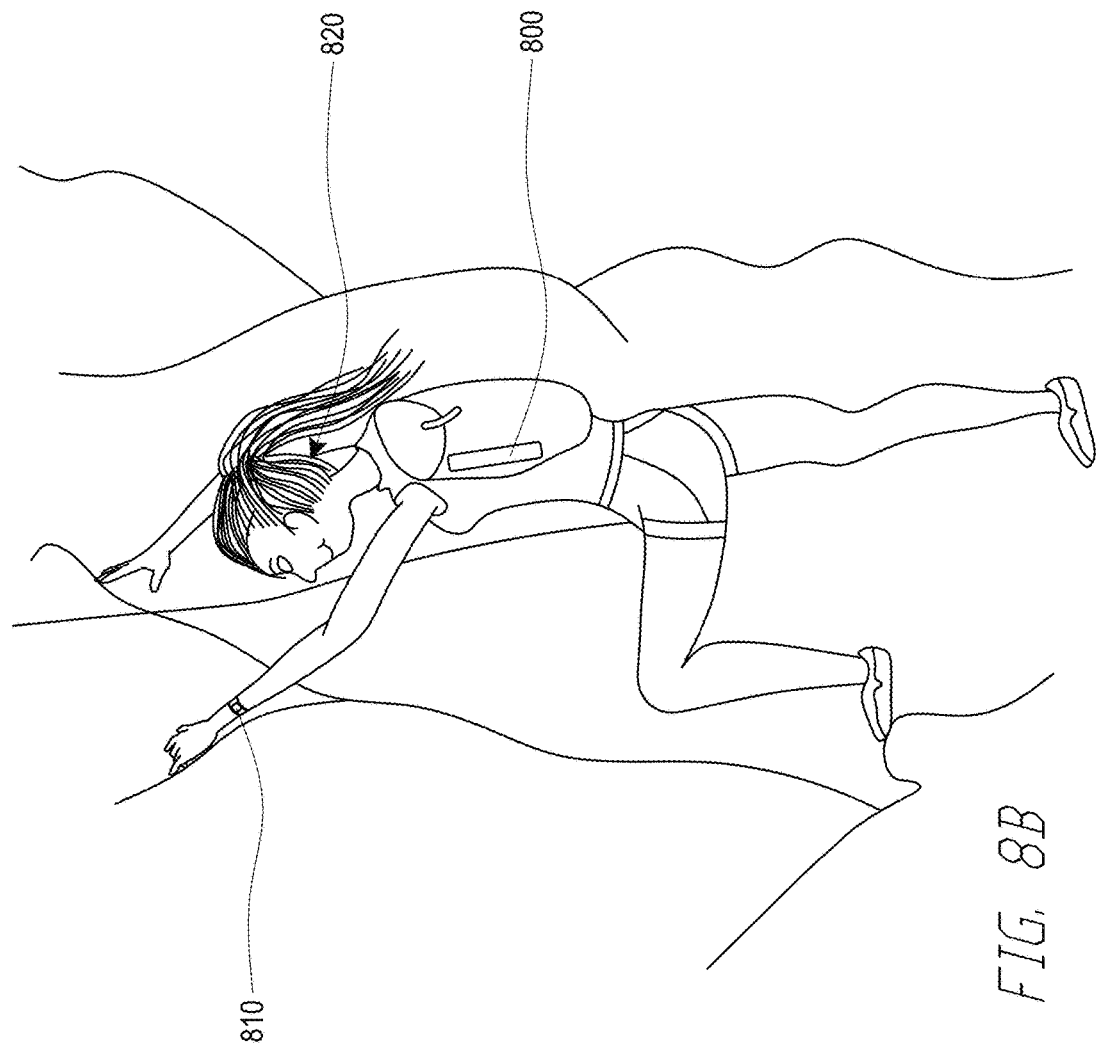
FIG. 8B illustrates an operator performing a hazardous activity while connected to an exemplary emergency system, according to some embodiments.

FIG. 8A is a block diagram of an emergency system comprising a person-portable separable device 800 and a wearable sensor unit 810, according to an embodiment. FIG. 8B illustrates an operator 820 connected to such a system while rock climbing, an activity associated with well-known hazards to life and limb. Device 800 comprises a data recorder 844, and a separation controller 848, the latter being connected to a separation mechanism 852 and/or a beaconing mechanism 853. The separation controller 848 can be part of the CPU 410 as discussed herein. In some embodiments, the separation controller 848 is separate from the CPU 410. Advantageously, device 800 may include both a separation mechanism 852 to separate from the operator in the event of an emergency, a beaconing mechanism 853 to send out a beaconing signal or distress signal in the event of an emergency, or both.

In an embodiment, device 800 may be, as illustrated, attached to a backpack of operator 820. In an alternative embodiment, device 800 may itself be wearable and attached to operator 820 via a wristband, bracelet, a key chain, seams. In an embodiment, device 800 does not comprise separation mechanism 852, and is configured to remain with or close to the operator when an emergency is detected and transmit a beaconing signal via beaconing mechanism 853, allowing responders to learn about operator 820's condition and, if necessary, locate operator 820.

Device 800 communicates through a data link, such as datalink 806, with a wearable device 810. Datalink 806 may be, for example, a Bluetooth or Bluetooth LE connection. Wearable device 810 may be a dedicated device, or may be a commercial, off the shelf product, such as a smart watch or other fitness/activity tracker. Wearable device 810 may comprise various systems and sensors, such as a body temperature sensor 830 that registers the body temperature of the operator, a heart rate sensor 840 that registers the heart rate of the operator and a blood oxygen sensor 850, that, for example through pulse oximetry, measures the blood oxygen concentration of the operator. Wearable device 810 may continuously or intermittently send this information to device 800 via datalink 806.

Device 800 may further include a data acquisition module 849, comprising various sub-modules, including a GPS module 849a, an accelerometer and/or gyroscope module 849b, and/or a barometer module 849c, which can be wired or wireless communication with corresponding sensors that accomplish a predetermined sensing task. These sensors may be incorporated as part of or be separate from the device 800. The data acquisition module 849 may receive and store data from these submodules and make it available to data recorder 844 and separation controller 848. Advantageously, because data acquisition module 849 may operate independently from datalink 806, data acquisition may take place even if the connection to wearable device 810 is interrupted or wearable device 810 is not used, thus increasing the chance that at least some data will be recorded at a given point in time.

Data recorder 844 (e.g., memory) may capture and record the measurements and data provided by wearable device 810 and data acquisition module 849. For example, data recorder 844 may, at periodic intervals, for example every 1 ms, every 10 ms, every 100 ms, every second, every 10 s, every minute or every 10 min, create an entry in its recordings comprising the operator's body temperature, heart rate, blood oxygen contents in addition to a GPS position, acceleration value, barometric pressure, and a current time period. The data recorder 844 may receive data from the wearable device 810 and/or the data acquisition module 849 via one or more communication interfaces. The communication interface may be common to all data sources, or there may be a dedicated communication interface for each data source (e.g., the wearable device 810 and/or the data acquisition module 849).

Separation controller 848 can also receive the data from the wearable device 810 and/or the data acquisition module 849 via, for example, a communication interface as discussed herein. The data acquisition module 849 can be part of the CPU 410 as discussed herein. In some embodiments, the data acquisition module 849 is separate from the CPU 410 and/or separation controller 848. The separation controller 848 can interpret the data to determine whether a separation trigger has been met. For example, separation controller 848 may monitor whether the operator's heart rate falls below a certain level or predetermined threshold, whether the operator's body temperature falls below or rises above a certain level or predetermined threshold, or whether the operator's blood oxygen content drops below a certain level or predetermined threshold, or whether a major shock or decompression event was detected. Upon a separation trigger being met, separation controller 848 may begin the separation process by triggering separation mechanism 852. Separation controller 848 may also activate beaconing mechanism 853, which may be implemented by one or more beaconing mechanisms, such as discussed herein (e.g. a light, a radio beacon, a smoke generator, a pyrotechnic device).

To help avoid false alarms and undesirable separation or beaconing by the device 800, separation controller 848 may, via datalink 806 (e.g., communication link), first generate an alert that is made audible, visual, or tactile by wearable device 810 through notification system 814, and/or by device 800 through notification system 847. Notification system 814 and notification system 847 may comprise various types of notification devices, such as a buzzer, a strobe light, a vibration device, etc, and may be linked so that notification system 847 and notification system 814 alert at the same time. The alert may indicate to the operator that device 800 has detected a potentially critical or life threatening event, and that separation and/or beaconing is imminent unless cancelled by the operator. If the operator determines it to be a false alarm, for example a false reading, the operator may cancel separation on the wearable device 810 by pushing activation mechanism, such as a button, 818, and/or on device 800 by activating a mechanism, such as pushing a button, 845. This causes wearable device 810 and device 800 to cancel the alarm and notify separation controller 848 that separation and/or beaconing is, at the moment, not desired by the operator. If the operator does not respond to the alarm within a predetermined time frame, for example three seconds, or eight seconds, or ten seconds, separation controller 848 may proceed to initiate separation by igniting the separation mechanism 852 and/or initiate beaconing by starting beaconing mechanism 853. Button 818 may also allow the operator to manually cause separation and/or beaconing, for example when a life threatening or critical event occurs that is not detected by the wearable device 810 and/or device 800, such as the operator being held at gunpoint.

It will be appreciated that embodiments of device 800 may operate together with one, more or none of wearable device 810. For example, in some embodiments, several wearable devices may be connected to device 800, wherein one wearable device may measure pulse and another wearable device to measure body temperature. In another embodiment, only one wearable device 810 may provide one or more measurements. In some embodiments, wearable device 810 may not be connected, e.g. with device 800 recording sufficient data from internal data acquisition module 849 for the device 800 to function as discussed herein. For example, the wearable device 810 may malfunction and/or the device 800 is configured to function without connections to wearable devices 810.

Figure 9:
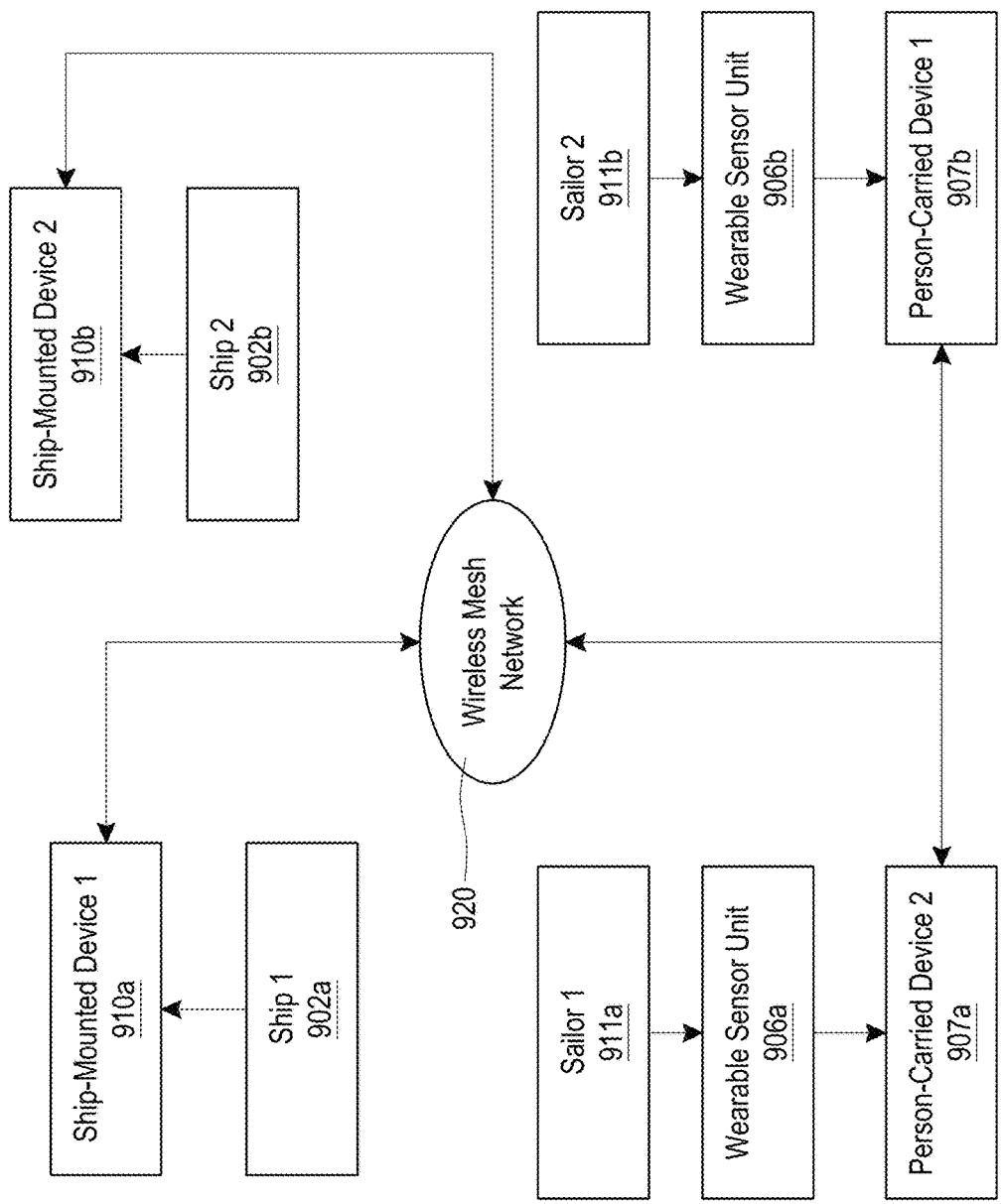
FIG. 9 illustrates a schematic configuration of multiple exemplary devices in a "mesh" configuration, according to some embodiments.

FIG. 9 illustrates a schematic illustration of multiple devices in a mesh, or networked, or interconnected, or synergistic, or redundant configuration. The configuration may be considered redundant or synergistic because the system comprised of the several devices may redundantly store information and thus have a greater chance of providing information recovery than its constituent devices individually.

Ship 1 902a and Ship 2 902b may be two naval vessels located near each other, for example an aircraft carrier with an escorting vessel; each ship carries a ship-mounted emergency device 910a and 910b respectively, which receive and record information from the ship's systems and instruments, as previously discussed. Sailor 1 911a and Sailor 2 911b, assigned to Ship 1 902a and Ship 2 902b, respectively, each carry wearable sensor units 906a and 906b and person-portable emergency devices 907a and 907b, respectively. As such, wearable sensor unit 906a may measure, and device 907a may record, the vital signs and other information related to Sailor 1 911a, while Sailor 2 911b's devices perform the same function for Sailor 2 011b. Advantageously, devices 910a, 910b, 907a and 907b form a wireless mesh network 920. Advantageously, this allows each device to broadcast its information to other connected devices; accordingly, each device receives and records redundant copies of data recorded by other devices. If contact to Sailor 1 911a is lost, such as for example Sailor 1 911a is launched overboard, devices carried by Ship 1 902a, Ship 2 902b and Sailor 2 911b will have recorded Sailor 1 911a's last known position, vital signs, and other information. Similarly, if Ship 1 902a is sunk, Sailor 1's device 907a, Ship 2's device 910b, and Sailor 2's device 907b will carry a redundant recording of the information related to Ship 1. It will be appreciated that such a "mesh" carries redundant information and thus increases the chance that information will be recoverable even if one or more devices constituting the mesh are lost.

It will be appreciated that similar embodiments putting multiple devices in communication may be useful in the context of other activities or scenarios, such as a group of hikers, spelunkers, divers, motorcyclists or other athletes, a formation of aircraft, a convoy of land vehicles, a train comprising a locomotive of several train cars, etc.

FIGS. 10A, 10B, 10C and 10D illustrate various deployment mechanisms such as for providing separation between the device, and a host vehicle or operator. FIGS. 10A and 10C are frontal views, whereas FIGS. 10B and 10D are lateral views, of respective embodiments.

Launch tube 1012 may be affixed, for example by bracket and hardware mounts, to a launch vehicle, or may be carried by an operator. Launch tube 1012 is sealed by a seal 1013 which is configured to be ruptured upon ejection of device 1010.

FIG. 10A and FIG. 10B illustrate an embodiment of a device 1080, which is released from a host vehicle or operator using a solid fuel rocket 1085 attached to the device 1080. To prevent solid fuel rocket 1085 from destructively back blasting the launch vehicle, launch tube 1012 may be fashioned in a U-shape that allows for the exhaust gas from solid fuel rocket 1085 to be directed away from the launching vehicle. Rocket 1085 may be triggered through a blasting cap or electronic fuse that ignites upon an electric current from device 1080 being applied to it. Device 1080 may be held in launch tube 1012 by casing 1015, which may sealed at the top by a seal 1013 and at the bottom by a bottom seal 1014. Seals 1013 and 1014 may be, for example, polypropylene covers that are configured to be ruptured or ejected by rocket 1085 upon ejection of device 1010. Device 1080 may be supported by and rest on seal 1014 before separation and thus be kept upright by the walls of launch tube 1012, it or may, in an alternative embodiment, be separately (e.g. magnetically) attached to launch tube 1012 (e.g. through lateral mounts). Alternatively, device 1080 may be held by interference by radial protrusions within launch tube 1012.

FIG. 10C and FIG. 10D illustrate a mechanism powered by a mechanically loaded coiled spring 1022 that is inserted between the launch tube 1012 and the device 1010 so that coiled spring 1022 is compressed. Spring 1022 may be, as illustrated, a mechanical spring, or may be a gas loaded spring. Device 1010 is secured via release cable 1026, running inside the spring, to release device 1030. Release device 1030 is electrically connected to device 1010 and is configured to release wire 1026 when an electric current is applied to it. Release device 1030 may be, for example, a redundant fuse wire release device. The redundant fuse wire release device can be a non-pyrotechnic wire release mechanism that can be electronically triggered by the application of electric current and that provides for reliable and quick release of the wire. Advantageously, this allows for a design for the release of device 1010 with reduced need to rely on potentially hazardous explosive compounds. Alternatively, release device 1030 may be a pyrotechnic charge. When cable 1026 is released by release device 1030, spring 1022 is free to expand and thus push device 1010 away from the host vehicle or operator, breaking seal 1013.

In an embodiment, the release mechanisms from FIG. 10A-B and FIG. 10C-D may be combined to provide a rocket-propelled "soft release"; the spring-release mechanism is released first to initially propel the device, including the rocket, out of launch tube 1012. The rocket is then ignited with a short delay, such as a second, thus allowing the device to gain some distance from the launch vehicle and thus further avoiding destructive backblast.

The processes, computer readable medium, and systems described herein may be performed on various types of hardware, such as computer systems or computing devices. Computing devices or computer systems may include a bus or other communication mechanism for communicating information, and a processor coupled with the bus for processing information. A computer system or device may have a main memory, such as a random access memory or other dynamic storage device, coupled to the bus. The main memory may be used to store instructions and temporary variables. The computer system or device may also include a read-only memory or other static storage device coupled to the bus for storing static information and instructions. The computer systems or devices may also be coupled to a display, such as a CRT, LCD monitor, LED array, e-paper, projector, or stereoscopic display. Input devices may also be coupled to the computer system or device. These input devices may include a mouse, a trackball, touchscreen, tablet, foot pedal, or cursor direction keys.

Each computer system or computing device may be implemented using one or more physical computers, processors, embedded devices, field programmable gate arrays (FPGAs), or computer systems or portions thereof. The instructions executed by the computer system or computing device may also be read in from a computer-readable medium. The computer-readable medium may be non-transitory, such as a CD, DVD, optical or magnetic disk, laserdisc, flash memory, or any other medium that is readable by the computer system or device. In some embodiments, hardwired circuitry may be used in place of or in combination with software instructions executed by the processor. Communication among modules, systems, devices, and elements may be over a direct or switched connections, and wired or wireless networks or connections, via directly connected wires, or any other appropriate communication mechanism. Transmission of information may be performed on the hardware layer using any appropriate system, device, or protocol, including those related to or utilizing Firewire, PCI, PCI express, CardBus, USB, CAN, SCSI, IDA, RS232, RS422, RS485, 802.11, etc. The communication among modules, systems, devices, and elements may include handshaking, notifications, coordination, encapsulation, encryption, headers, such as routing or error detecting headers, or any other appropriate communication protocol or attribute. Communication may also include messages related to HTTP, HTTPS, FTP, TCP, IP, ebMS OASIS/ebXML, DICOM, DICOS, secure sockets, VPN, encrypted or unencrypted pipes, MIME, SMTP, MIME Multipart/Related Content-type, SQL, etc.

The features and attributes of the specific embodiments disclosed herein may be combined in different ways to form additional embodiments, all of which fall within the scope of the present disclosure.

It is contemplated that various combinations or subcombinations of the specific features and aspects of the embodiments disclosed herein may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described herein. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A system for communicating data associated with a catastrophic event for a vehicle, the system comprising:
    a housing comprising a first communication interface and a wall configured to connect to a body of a vehicle, wherein the first communication interface is configured to receive data associated with an operating parameter of the vehicle;
    a telecommunication emergency device configured to be at least partially enclosed by the housing, the device comprising:
    a device body comprising material of greater impact strength relative to impact strength of the body of the vehicle;
    a second communication interface on the device body, the second communication interface configured to communicate with the first communication interface and receive the data associated with the operating parameter;
    a memory in the device body, the memory electrically connected to the second communication interface and capable of storing data transmitted to the second communication interface;
    a radio beacon configured to broadcast data associated with the telecommunication emergency device comprising information for facilitating determining location of the telecommunication emergency device;
    a power source capable of powering the radio beacon; and
    a stabilizer connected to the device body, the stabilizer configured to control an aerial descent of the telecommunication emergency device when the telecommunication emergency device is propelled from the housing; and
    a deployment mechanism in the housing, the deployment mechanism capable of propelling the telecommunication emergency device out of the housing through the body of the vehicle in response to the operating parameter, wherein deployment mechanism is activated in response to the operating parameter being indicative of a catastrophic event,
    wherein the memory is configured to store the data associated with the operating parameter of the vehicle before or during the catastrophic event for retrieval after the catastrophic event,
    wherein the data associated with the catastrophic event is signed for integrity of the data,
    wherein signing of the data associated with the catastrophic event comprises using a private key to store the data associated with the catastrophic event onto the memory, and wherein the private key is deleted after it is determined the catastrophic event has occurred, and
    wherein signing of the data associated with the catastrophic event comprises using a public key to access the data after the private key is deleted.

2. The system of claim 1, wherein the housing comprises a flange connected to the wall, the flange extending along the body of the vehicle when connected to the body of the vehicle.

3. The system of claim 2, wherein the flange is configured to connect to the body of the vehicle via fasteners.

4. The system of claim 1, wherein the stabilizer comprises a wing connected to the housing, and wherein the wing extends substantially along a surface of the device body when the telecommunication emergency device is in the housing, and wherein upon the telecommunication emergency device being propelled out of the housing, the wing extend at least partially away from the surface of the device body.

5. The system of claim 4, wherein the device body comprises a recess corresponding to the wing, wherein the wing is in the recess and substantially flush with the device body when the telecommunication emergency device is in the housing.

6. The system of claim 1, wherein the deployment mechanism comprises a solid fuel rocket configured to be ignited to propel the telecommunication emergency device out of the housing.

7. The system of claim 6, further comprising a launch tube connected to the housing, the launch tube extending away from the housing to direct exhaust gases away from the telecommunication emergency device upon ignition of the solid fuel rocket.

8. The system of claim 1, wherein the deployment mechanism comprises a spring configured to propel the telecommunication emergency device out of the housing.

9. The system of claim 1, wherein the operating parameter of the vehicle corresponds to at least one of location, altitude, or speed of the vehicle.

10. A telecommunication emergency device for communicating data associated with a predetermined event, the device comprising:
a communication interface configured to receive data associated with a predetermined event;
a memory connected to the communication interface and capable of storing the data transmitted to the communication interface, wherein the data associated with the predetermined event is signed for integrity of the data, and wherein the memory is configured to store the data associated with the predetermined event before or during the predetermined event for retrieval after the predetermined event;
a radio beacon configured to broadcast data associated with the telecommunication emergency device comprising information for facilitating determining location of the telecommunication emergency device;
a power interface capable of providing power to the radio beacon, the power interface configured to connect to a power source; and
a stabilizer configured to control an aerial descent of the telecommunication emergency device, the aerial descent associated with deployment of the telecommunication emergency device,
wherein signing of the data associated with the predetermined event comprises using a private key to store the data associated with the predetermined event onto the memory, and wherein the private key is deleted after it is determined the predetermined event has occurred, and
wherein signing of the data associated with the predetermined event comprises using a public key to access the data after the private key is deleted.

11. The telecommunication emergency device of claim 10, wherein the data associated with the predetermined event stored on the memory corresponds with at least one of location, altitude, or speed of a vehicle that the telecommunication emergency device is associated with.

12. The telecommunication emergency device of claim 10, wherein the data associated with the predetermined event stored on the memory corresponds with at least one of heart rate, breathing rate, blood oxygen, or temperature of a person that the telecommunication emergency device is associated with.

13. The telecommunication emergency device of claim 10, wherein the communication interface is configured to communicate with one or more sensors to receive from the one or more sensors the data associated with the predetermined event.

14. The telecommunication emergency device of claim 10, further comprising a sensor configured to detect at least one of acceleration or altitude of the telecommunication emergency device to facilitate determining whether the predetermined event is imminent or occurring.

15. The telecommunication emergency device of claim 10, further comprising a Global Positioning System (GPS) module, wherein the GPS module locks in the location of the telecommunication emergency device upon occurrence of the predetermined event.

16. The telecommunication emergency device of claim 10, further comprising an illumination beacon configured to pulse in a predetermined pattern after the predetermined event to facilitate locating the telecommunication emergency device.

17. The telecommunication emergency device of claim 10, wherein the radio beacon is configured to transmit a sweeping directional beam to facilitate locating the telecommunication emergency device after the predetermined event.

18. A telecommunication emergency device for communicating data associated with a predetermined event, the device comprising:
a communication interface configured to receive data associated with a predetermined event;
a memory connected to the communication interface and capable of storing the data transmitted to the communication interface, wherein the data is protected to inhibit unauthorized access to the data or tampering with the data, and wherein the memory is configured to store the data associated with the predetermined event before or during the predetermined event for retrieval after the predetermined event;
a radio beacon configured to broadcast data associated with the telecommunication emergency device for facilitating determining location of the telecommunication emergency device;
a power interface capable of providing power to the radio beacon; and
a stabilizer configured to control an aerial descent of the telecommunication emergency device, the aerial descent associated with deployment of the telecommunication emergency device,
wherein the data associated with the predetermined event is signed for integrity of the data,
wherein signing of the data associated with the predetermined event comprises using a private key to store the data associated with the predetermined event onto the memory, and wherein the private key is deleted after it is determined the predetermined event has occurred, and
wherein signing of the data associated with the predetermined event comprises using a public key to access the data after the private key is deleted.

19. A plurality of telecommunication emergency devices according to claim 18, wherein the plurality of telecommunication emergency devices are configured to communicate with each other, wherein at least one telecommunication emergency device of the plurality of telecommunication emergency devices is configured to redundantly store data associated with at least one other telecommunication emergency device of the plurality of telecommunication emergency devices.

20. The telecommunication emergency device of claim 10, wherein the private key is deleted after it is determined the predetermined event has occurred to prevent modification of the stored data after deployment of the telecommunication emergency device.

21. The telecommunication emergency device of claim 10, wherein upon deletion of the private key, new data is prevented from being added to the memory.

22. The telecommunication emergency device of claim 18, wherein the data associated with the predetermined event stored on the memory corresponds with at least one of heart rate, breathing rate, blood oxygen, or temperature of a person that the telecommunication emergency device is associated with.

* * * * *